US012686220B2

(12) United States Patent
Koike et al.

(10) Patent No.: US 12,686,220 B2
(45) Date of Patent: Jul. 21, 2026

(54) RECORDING DEVICE AND CONTROL METHOD

(71) Applicant: SEIKO EPSON CORPORATION, Tokyo (JP)

(72) Inventors: Yoshikazu Koike, Chino (JP); Takamasa Ikagawa, Matsumoto (JP); Shintaro Komuro, Matsumoto (JP); Hirohisa Adachi, Matsukawa-machi (JP); Masaki Miyazawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 89 days.

(21) Appl. No.: 18/325,144

(22) Filed: May 30, 2023

(65) Prior Publication Data

US 2023/0382140 A1 Nov. 30, 2023

(30) Foreign Application Priority Data

May 30, 2022 (JP) ................................ 2022-087475

(51) Int. Cl.
*B41J 11/00* (2006.01)
*B41J 29/17* (2006.01)
*B41J 29/393* (2006.01)

(52) U.S. Cl.
CPC ............. *B41J 29/17* (2013.01); *B41J 11/007* (2013.01); *B41J 29/393* (2013.01); *B41J 2203/01* (2020.08)

(58) Field of Classification Search
CPC ........ B41J 29/17; B41J 11/007; B41J 29/393; B41J 15/048
See application file for complete search history.

(56) References Cited

U.S. PATENT DOCUMENTS

2009/0169223 A1* 7/2009 Yamaki ................ G03G 15/161 399/60
2016/0279970 A1* 9/2016 Nakata .................. B41J 13/025
2017/0246887 A1 8/2017 Mori

FOREIGN PATENT DOCUMENTS

JP 2006327175 A 12/2006
JP 2008030430 A * 2/2008

(Continued)

OTHER PUBLICATIONS

Mori, Machine TranslationofJP-2008030430-A, 2008 (Year: 2008).*
Office Action for CN Patent Application No. 202310620988, issued on Jul. 18, 2025, 12 pages.

*Primary Examiner* — Scott A Richmond
(74) *Attorney, Agent, or Firm* — CHIP LAW GROUP

(57) ABSTRACT

A recording device configured to perform recording on a recording medium, includes a recording unit; a medium transport belt configured to transport the recording medium on which the recording is to be performed by the recording unit; a cleaning unit configured to move to a contact position at which the cleaning unit is in contact with the medium transport belt or a non-contact position at which the cleaning unit is not in contact with the medium transport belt, and to perform a cleaning operation on the medium transport belt when the cleaning unit is positioned at the contact position; a discrimination section configured to discriminate a surface state of the medium transport belt; and a control section configured to cause the cleaning unit to execute the cleaning operation according to the surface state of the medium transport belt discriminated by the discrimination section.

6 Claims, 11 Drawing Sheets

(56) References Cited

FOREIGN PATENT DOCUMENTS

| | | | | |
|---|---|---|---|---|
| JP | 2017149534 | A | 8/2017 | |
| WO | WO-2020185305 | A1 * | 9/2020 | ......... G03G 15/6576 |

* cited by examiner

| PRINT DUTY RANGE | 0 TO 20% | 21 TO 40% | 41 TO 60% | 61% OR MORE |
|---|---|---|---|---|
| BELT CLEANING TIME | 20s | 30s | 45s | 90s |

| PRINT DUTY RANGE | 0 TO 20% | 21 TO 40% | 41 TO 60% | 61% OR MORE |
|---|---|---|---|---|
| BELT DRIVE SPEED | 500mm/s | 375mm/s | 250mm/s | 125mm/s |
| BELT CLEANING TIME | 5s | 10s | 23s | 90s |

FIG. 11

| PRINT DUTY RANGE | 0 TO 20% | 21 TO 40% | 41 TO 60% | 61% OR MORE |
|---|---|---|---|---|
| BELT CLEANING TIME | 20s | 30s | 45s | 90s |
| CLEANING CROTH TRANSPORT AMOUNT | 40mm | 60mm | 90mm | 180mm |

FIG. 12

| CHARGING CURRENT RANGE | 0 TO 0.70mA | 0.71 TO 0.80mA | 0.81 TO 0.90mA | 0.91mA OR MORE |
|---|---|---|---|---|
| BELT CLEANING TIME | 0s | 20s | 35s | 90s |

FIG. 13

RECORDING DEVICE AND CONTROL METHOD

The present application is based on, and claims priority from JP-A-2022-087475, filed May 30, 2022, the disclosure of which is hereby incorporated by reference herein in its entirety.

BACKGROUND

1. Technical Field

This present disclosure relates to a recording device and a control method.

2. Related Art

There is known a recording device having a cleaning unit for cleaning a transport belt for transporting a recording medium. The cleaning unit described in JP-A-2017-149534 is configured to be switchable between a contact state and a non-contact state with respect to the transport belt. The cleaning unit includes a cleaning material that contacts the transport belt to clean the transport belt. The recording device executes a first cleaning control and a second cleaning control. The first cleaning control is a control in which a refreshing operation of the cleaning material is not performed during the cleaning operation. The second cleaning control is control in which the refreshing operation of the cleaning material is performed during the cleaning operation. The recording device performs first cleaning control or second cleaning control in accordance with the occurrence of an event.

The recording device elects the cleaning control in accordance with occurrence of an event. Therefore, the cleaning of the transport belt is not always executed corresponding to a contamination state of the transport belt.

SUMMARY

A recording device of the present disclosure includes a recording device configured to perform recording on a recording medium, includes a recording unit configured to perform the recording by ejecting ink onto the recording medium; a medium transport belt configured to transport the recording medium on which the recording is to be performed by the recording unit; a cleaning unit configured to move to a contact position at which the cleaning unit is in contact with the medium transport belt or a non-contact position at which the cleaning unit is not in contact with the medium transport belt, and to perform a cleaning operation on the medium transport belt when the cleaning unit is positioned at the contact position; a discrimination section configured to discriminate a surface state of the medium transport belt; and a control section configured to cause the cleaning unit to execute the cleaning operation according to the surface state of the medium transport belt discriminated by the discrimination section.

A control method according to the present disclosure, a control method for a recording device configured to perform recording on a recording medium, includes performing the recording by transporting the recording medium by a medium transport belt and ejecting ink onto the recording medium supported by the medium transport belt; discriminating a surface state of the medium transport belt; moving a cleaning unit from a non-contact position at which the cleaning unit is not in contact with the medium transport belt to a contact position at which the cleaning unit is in contact with the medium transport belt; and causing the cleaning unit in contact with the medium transport belt to perform a cleaning operation according to the surface state.

BRIEF DESCRIPTION OF THE DRAWINGS

FIG. 11 is a diagram showing an example of the control table.

FIG. 12 is a diagram showing an example of the control table.

FIG. 13 is a diagram showing an example of the control table.

DESCRIPTION OF EMBODIMENTS

Figure 1:
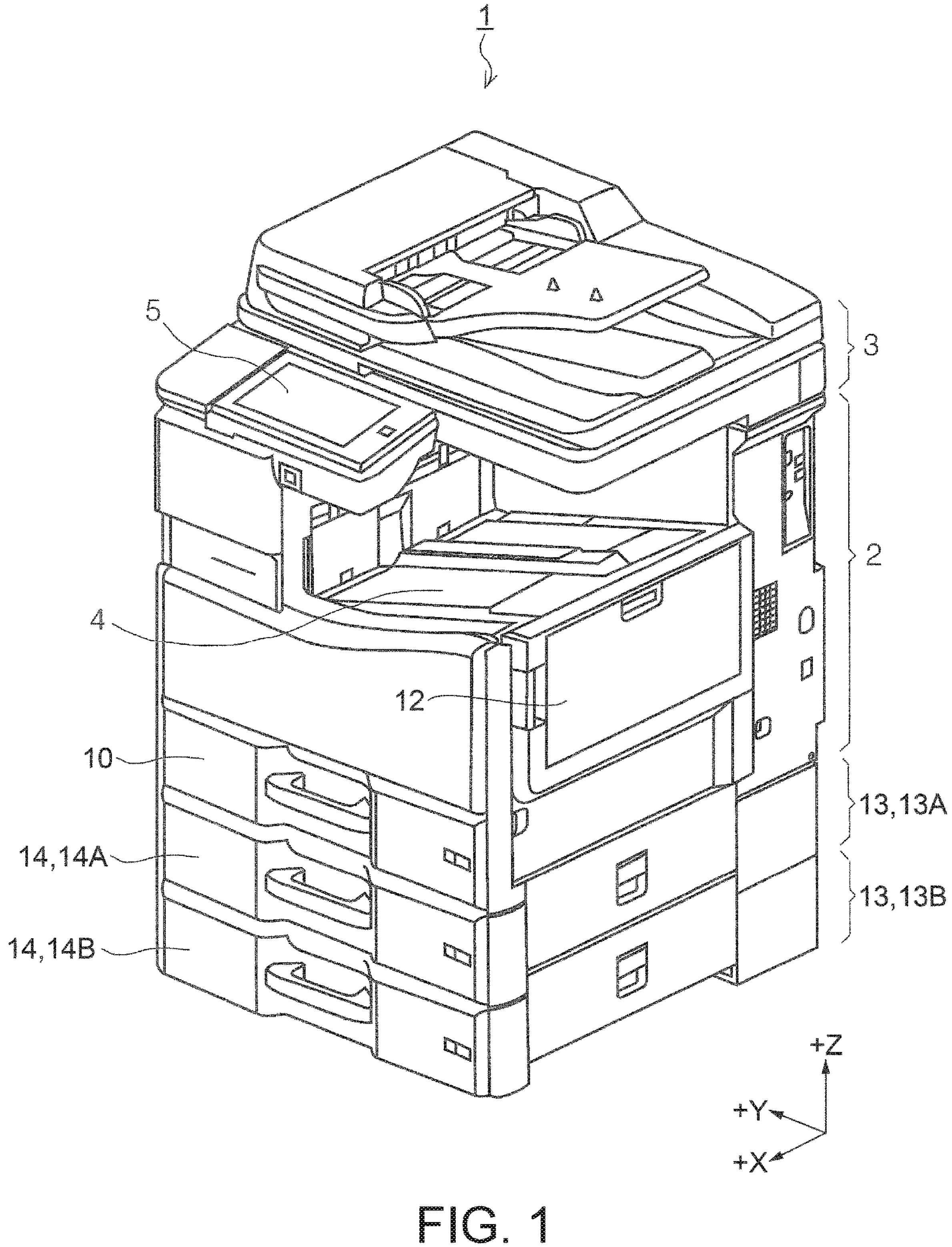
FIG. 1 is a schematic diagram showing an appearance of a printer.

FIG. 1 is a schematic diagram showing an appearance of a printer 1. FIG. 1 is a perspective view showing the appearance of the printer 1. The printer 1 is an inkjet printer. The printer 1 performs printing by ejecting ink onto a print medium M. The printer 1 corresponds to an example of a recording device. The print medium M corresponds to an example of a recording medium. Printing corresponds to an example of recording.

A plurality of figures, including FIG. 1, show an XYZ coordinate system. An X-axis is an axis parallel with respect to an installation surface of the printer 1. A +X direction is a direction in which a sheet feeding cassette 10 (to be described later) is drawn out. A −X direction is a direction in which the sheet feeding cassette 10 is inserted. A Y-axis is an axis parallel with respect to the installation surface of the printer 1. A +Y direction is a direction in which the print medium M is transported at a position facing a printing unit 18 (to be described later). A −Y direction is a direction opposite to the direction in which the print medium M is transported at a position facing the printing unit 18. A Z-axis is an axis perpendicular with respect to the installation surface of the printer 1. A +Z direction is a direction directed upward from the installation surface. A −Z direction is a direction downward from the installation surface.

The printer 1 includes a device main body 2, a scanner unit 3, a sheet discharge tray 4, a control panel 5, a sheet feeding cassette 10, and an additional unit 13. The printer 1 is a multifunction device including the scanner unit 3.

The device main body 2 is a printer unit having a printing function that performs printing on the print medium M. The device main body 2 is configured so that units such as the scanner unit 3, the additional unit 13, or the like can be connected thereto.

The scanner unit 3 has a reading function of reading a document. The scanner unit 3 reads the document and generates read data. The read data is transmitted to an external device or the like. The printer 1 is capable of printing print data based on the read data. The scanner unit 3 is disposed at a position in the +Z direction of the device main body 2.

The print medium M transported inside the device main body 2 is placed on the sheet discharge tray 4. The print medium M on which printing is performed by the printing unit 18 is discharged to the sheet discharge tray 4. The print medium M discharged in a face-down posture is placed on the sheet discharge tray 4.

The control panel 5 receives an operation input by a user. The control panel 5 generates input data based on the operation input by the user. The control panel 5 displays various screens. As an example, the control panel 5 is configured by a display panel having a touch input function. The display panel is configured by a liquid crystal display, an organic electro-luminescence (organic EL) display or the like. The control panel may include an operation section that receives the operation input by the user and a display unit having a display function. The control panel 5 corresponds to an example of a display section.

The sheet feeding cassette 10 places the print medium M. The sheet feeding cassette 10 accommodates the print medium M fed to the printing unit 18. The sheet feeding cassette 10 is capable of accommodating the print medium M of various sizes. The sheet feeding cassette 10 is provided at a position in the −Z direction of the device main body 2. The sheet feeding cassette is configured to be drawable in the +X direction. When the sheet feeding cassette 10 is drawn out in the +X direction, the user can supply the print medium M.

An opening and closing cover 12 is opened and closed by a user's operation. The opening and closing cover 12 is swingable around a swing shaft (not shown). When the opening and closing cover 12 is opened, the device main body 2 is configured to be able to supply the print medium M. The opening and closing cover 12 functions as a manual sheet feeding tray.

The additional unit 13 is an optional unit that can be attached to the device main body 2. The additional unit 13 is provided at a position in the −Z direction of the device main body 2. The printer 1 shown in FIG. 1 includes a first additional unit 13A and a second additional unit 13B as the additional unit 13. The first additional unit 13A and the second additional unit 13B each include an additional sheet feeding cassette 14.

The first additional unit 13A is attached to the device main body 2 at a position in the −Z direction of the device main body 2. The first additional unit 13A includes a first additional sheet feeding cassette 14A which is the additional sheet feeding cassette 14. The first additional sheet feeding cassette 14A is provided at a position in the −Z direction of the sheet feeding cassette 10. The first additional sheet feeding cassette 14A accommodates the print medium M. A size of the print medium M accommodated in the first additional sheet feeding cassette 14A may be the same as or different from a size of the print medium M accommodated in the sheet feeding cassette 10.

The second additional unit 13B is attached to the first additional unit 13A at a position in the −Z direction of the first additional unit 13A. The second additional unit 13B includes a second additional sheet feeding cassette 14B, which is the additional sheet feeding cassette 14. The second additional sheet feeding cassette 14B is provided at a position in the −Z direction of the first additional sheet feeding cassette 14A. The second additional sheet feeding cassette 14B accommodates the print medium M. A size of the print medium M accommodated in the second additional sheet feeding cassette 14B may be the same as or different from the size of the print medium M accommodated in the sheet feeding cassette 10.

Figure 2:
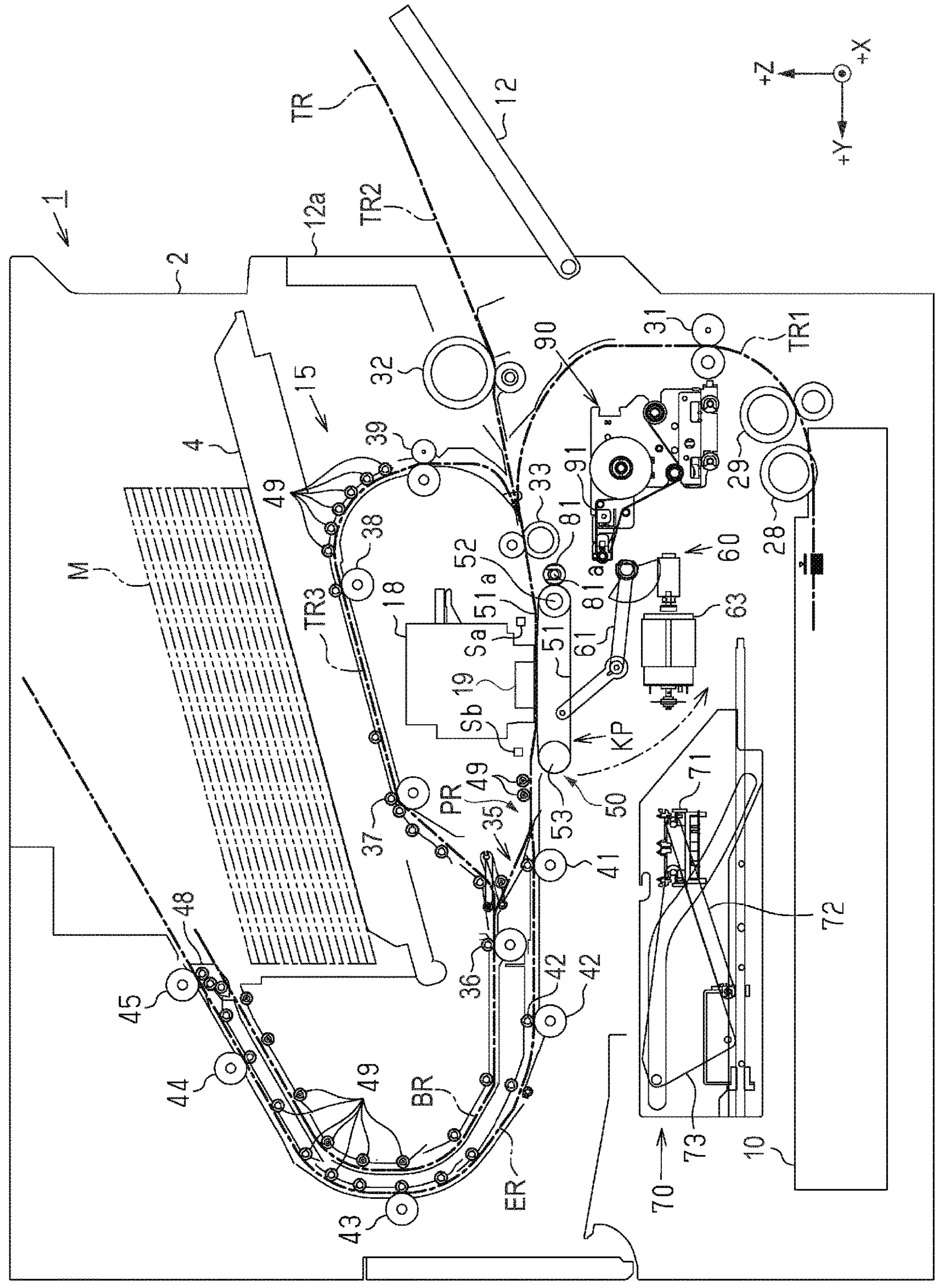
FIG. 2 is a diagram showing a cross sectional configuration of the printer.

FIG. 2 shows a cross sectional configuration of the printer 1. FIG. 2 shows a schematic configuration of the inside of the device main body 2. FIG. 2 shows configuration of the printer 1 when a transport belt 51 is positioned at the recording position KP. The recording position KP will be described later. The printer 1 can perform printing on the print medium M. FIG. 2 shows the printer 1 in a state where the opening and closing cover 12 is opened. FIG. 2 shows each member disposed along a transport path TR. The printer 1 transports the print medium M along the transport path TR.

The printer 1 includes the sheet feeding cassette 10, the opening and closing cover 12, a transport mechanism 15, the printing unit 18, the sheet discharge tray 4, a transport belt unit 50, a belt unit movement mechanism 60, a head cleaning mechanism 70, and a belt cleaning mechanism 90. The transport path TR includes a first transport path TR1, a second transport path TR2, a printing path PR, a branch path BR, a third transport path TR3, and a sheet discharge path ER.

The first transport path TR1 is a path from the sheet feeding cassette 10 to a sheet feed roller pair 33. The first transport path TR1 includes a pickup roller 28, a separation roller 29, and a first roller pair 31.

The pickup roller 28 sends out the uppermost print medium M among the print media M accommodated in the sheet feeding cassette 10 in a stacked state. The pickup roller 28 feeds the print medium M to the separation roller 29. The pickup roller 28 constitutes a part of the transport mechanism 15.

The separation roller 29 separates the print medium M fed by the pickup roller 28 one sheet at a time. When the pickup roller 28 feeds out the plurality of printing media M, the separation roller 29 separates one sheet of the print medium M from among the plurality of printing media M. The separation roller 29 feeds the one sheet of the print medium M toward the first roller pair 31. The separation roller 29 constitutes a part of the transport mechanism 15.

The first roller pair 31 nips the print medium M fed by the separation roller 29. The first roller pair 31 transports the nipped print medium M toward the sheet feed roller pair 33. The first roller pair 31 transports the print medium M in the +Z direction. The print medium M transported in the first transport path TR1 moves from the sheet feeding cassette 10 to the sheet feed roller pair 33. The first roller pair 31 constitutes a part of the transport mechanism 15.

The second transport path TR2 is configured to be accessible when the opening and closing cover 12 is opened. When the opening and closing cover 12 is opened by the user, a sheet feeding port 12*a* is exposed. The sheet feeding port 12*a* is an opening through which the print medium M can be supplied. The opening and closing cover 12 functions as a manual sheet feeding tray. The second transport path TR2 is a path from the sheet feeding port 12*a* to the sheet feed roller pair 33. The second transport path TR2 includes a second roller pair 32.

The second roller pair 32 nips the print medium M fed from the sheet feeding port 12*a*. The second roller pair 32 transports the nipped print medium M toward the sheet feed roller pair 33. The second roller pair 32 transports the print medium M in the +Y direction. The print medium M transported in the second transport path TR2 moves from the sheet feeding port 12*a* to the sheet feed roller pair 33. The second roller pair 32 constitutes a part of the transport mechanism 15.

The printing path PR is a path from the sheet feed roller pair 33 to a branch mechanism 35. The printing path PR includes the sheet feed roller pair 33, a transport belt 51, a plurality of toothed rollers 49, and the branch mechanism 35. A first sensor Sa, the printing unit 18, and a second sensor Sb are provided along the printing path PR.

The sheet feed roller pair 33 transports the print medium M transported in the first transport path TR1 or the second transport path TR2 to the transport belt 51. The sheet feed roller pair 33 transports the print medium M transported in the third transport path TR3 to the transport belt 51. The sheet feed roller pair 33 adjusts timing at which the print medium M is sent out to the transport belt 51, and transports the print medium M. The sheet feed roller pair 33 constitutes a part of the transport mechanism 15.

The transport belt 51 supports the print medium M transported by the sheet feed roller pair 33. The transport belt 51 transports the supported print medium M in the +Y direction. The transport belt 51 transports the print medium M on which printing is to be performed by the printing unit 18. The transport belt 51 is an endless belt. The transport belt 51 supports the print medium M at a recording position KP shown in FIG. 2. The recording position KP is a position at which the transport belt 51 faces the printing unit 18. The transport surface 51*a* of the transport belt 51 supports the print medium M by attracts the print medium M by electrostatic attraction. The transport surface 51*a* is an outer peripheral surface of the transport belt 51. The transport belt 51 is provided in the transport belt unit 50. The transport belt 51 corresponds to an example of a medium transport belt.

The transport surface 51*a* in the +Z direction of the transport belt 51 positioned at the recording position KP faces the printing unit 18. The transport surface 51*a* that faces the printing unit 18 moves in the +Y direction. The transport surface 51*a* facing the printing unit 18 transports the print medium M to the position facing the printing unit 18. The transport belt 51 constitutes a part of the transport mechanism 15.

The plurality of toothed rollers 49 provided on the printing path PR are in contact with a recording surface of the print medium M. The recording surface is a surface printed by the printing unit 18. The toothed rollers 49 are driven to rotate by the movement of the print medium M. The toothed roller 49 suppresses lifting of the print medium M. The toothed roller 49 constitutes a part of the transport mechanism 15.

The branch mechanism 35 switches the transport path TR of the print medium M. The branch mechanism 35 switches the transport path TR to the sheet discharge path ER or the branch path BR. The branch mechanism 35 is provided at a position in the +Y direction of the printing unit 18 and the transport belt 51. As an example, the branch mechanism 35 is configured by a flap and a flap drive mechanism. The flap and the flap drive mechanism are not shown. The branch mechanism 35 constitutes a part of the transport mechanism 15.

The first sensor Sa detects the presence or absence of the print medium M. The first sensor Sa is provided at a position in the −Y direction of the printing unit 18 along the printing path PR. The first sensor Sa is provided between the sheet feed roller pair 33 and the printing unit 18. The first sensor Sa is configured by an optical sensor or the like. The first sensor Sa outputs a predetermined signal when the print medium M is detected.

The printing unit 18 performs printing on the print medium M. The printing unit 18 performs printing by ejecting ink onto the print medium M. The printing unit 18 has an inkjet head 19. The inkjet head 19 includes a plurality of nozzles (not shown). The plurality of nozzles are provided in a nozzle surface in the −Z direction of the inkjet head 19. The inkjet head 19 ejects ink onto the print medium M transported by the transport belt 51. The inkjet head 19 is configured by a line head that is longer than the width of the print medium M along the X-axis. The printing unit 18 corresponds to an example of a recording unit. The inkjet head 19 corresponds to an example of a print head.

The second sensor Sb detects the presence or absence of the print medium M. The second sensor Sb is provided at a position in the +Y direction of the printing unit 18 along the printing path PR. The second sensor Sb is configured by an optical sensor or the like. The second sensor Sb outputs a predetermined signal when the print medium M is detected.

The branch path BR is a path for transporting the print medium M guided by the branch mechanism 35. The print medium M transported to the branch path BR is transported to the third transport path TR3. The branch path BR includes a branch roller pair 36 and the plurality of toothed rollers 49.

The branch roller pair 36 transports the print medium M guided by the branch mechanism 35 in the +Y direction. Further, the branch roller pair 36 transports the print medium M in the −Y direction toward the third transport path TR3. The branch roller pair 36 rotates in a first direction and transports the print medium M in the +Y direction. The branch roller pair 36 rotates in a second direction opposite direction to the first direction and transports the print medium M in the −Y direction. The branch roller pair 36 rotates in the first direction and the second direction. The branch roller pair 36 constitutes a part of the transport mechanism 15.

The plurality of toothed rollers 49 provided on the branch path BR are in contact with the print medium M. The toothed rollers 49 are driven to rotate by the movement of the print medium M. The plurality of toothed rollers 49 provided on the branch path BR move the print medium M along the branch path BR. The plurality of toothed rollers 49 provided on the branch path BR constitute a part of the transport mechanism 15.

The third transport path TR3 is a path from the branch mechanism 35 to the sheet feed roller pair 33. The third transport path TR3 is a path for inverting the print medium M printed by the printing unit 18. By the print medium M being transported to the printing path PR via the third transport path TR3, a back surface of the print medium M faces the printing unit 18. The third transport path TR3 includes a first inversion transport roller pair 37, a second inversion transport roller pair 38, a third inversion transport roller pair 39, and the plurality of toothed rollers 49.

The first inversion transport roller pair 37, the second inversion transport roller pair 38, and the third inversion transport roller pair 39 transport the print medium M along the third transport path TR3. The first inversion transport roller pair 37, the second inversion transport roller pair 38, and the third inversion transport roller pair 39 transport the print medium M from the branch roller pair 36 to the sheet feed roller pair 33. The print medium M transported to the sheet feed roller pair 33 is transported to the printing path PR. The printing unit 18 performs printing on the back surface of the print medium M transported to the printing path PR. The first inversion transport roller pair 37, the second inversion transport roller pair 38, and the third inversion transport roller pair 39 constitute a part of the transport mechanism 15.

The first inversion transport roller pair 37, the second inversion transport roller pair 38, and the third inversion transport roller pair 39 are composed by two rollers. A driving force is transmitted to one of the two rollers by a drive transmission mechanism (not shown). The other roller of the two rollers is driven to rotate. The other roller may be of the same construction as the toothed roller 49.

The toothed rollers 49 provided on the third transport path TR3 are in contact with the print medium M transported in the third transport path TR3. The toothed rollers 49 provided on the third transport path TR3 are in contact with the printing surface of the print medium M printed by the printing unit 18. The toothed rollers 49 are driven to rotate by the movement of the print medium M. The toothed rollers 49 provided in the third transport path TR3 move the print medium M along the third transport path TR3. The toothed rollers 49 provided in the third transport path TR3 constitute a part of the transport mechanism 15.

The sheet discharge path ER is a path from the branch mechanism 35 to the discharge port 48. The sheet discharge path ER moves the print medium M guided by the branch mechanism 35 to the discharge port 48. The sheet discharge path ER includes a first sheet discharge roller pair 41, a second sheet discharge roller pair 42, a third sheet discharge roller pair 43, a fourth sheet discharge roller pair 44, a fifth sheet discharge roller pair 45, and the plurality of toothed rollers 49.

The first sheet discharge roller pair 41, the second sheet discharge roller pair 42, the third sheet discharge roller pair 43, the fourth sheet discharge roller pair 44, and the fifth sheet discharge roller pair 45 transport the print medium M in the sheet discharge path ER. The first sheet discharge roller pair 41, the second sheet discharge roller pair 42, the third sheet discharge roller pair 43, the fourth sheet discharge roller pair 44, and the fifth sheet discharge roller pair 45 transport the print medium M guided by the branch mechanism 35 to the discharge port 48. The print medium M transported to the discharge port 48 is discharged to the sheet discharge tray 4. The sheet discharge tray 4 places the discharged print medium M. The first sheet discharge roller pair 41, the second sheet discharge roller pair 42, the third sheet discharge roller pair 43, the fourth sheet discharge roller pair 44, and the fifth sheet discharge roller pair 45 constitute a part of the transport mechanism 15.

The first sheet discharge roller pair 41, the second sheet discharge roller pair 42, the third sheet discharge roller pair 43, the fourth sheet discharge roller pair 44, and the fifth sheet discharge roller pair 45 are composed by two rollers. A driving force is transmitted to one of the two rollers by a drive transmission mechanism (not shown). The other roller of the two rollers is driven to rotate. The other roller may be of the same construction as the toothed roller 49.

The toothed rollers 49 provided in the sheet discharge path ER are in contact with the print medium M transported in the sheet discharge path ER. The toothed rollers 49 are driven to rotate by the movement of the print medium M. The toothed rollers 49 provided on the sheet discharge path ER move the print medium M along the sheet discharge path ER. The toothed rollers 49 provided on the sheet discharge path ER constitute a part of the transport mechanism 15. The transport mechanism 15 includes the plurality of roller pairs, the plurality of toothed rollers 49, the transport belt 51, and a drive mechanism (not shown).

The transport belt unit 50 is a unit including the transport belt 51. The transport belt unit 50 is configured to be rotatable. FIG. 2 shows a transport belt unit 50 in which the transport belt 51 is positioned at the recording position KP. Details of the transport belt unit 50 will be described later.

Figure 3:
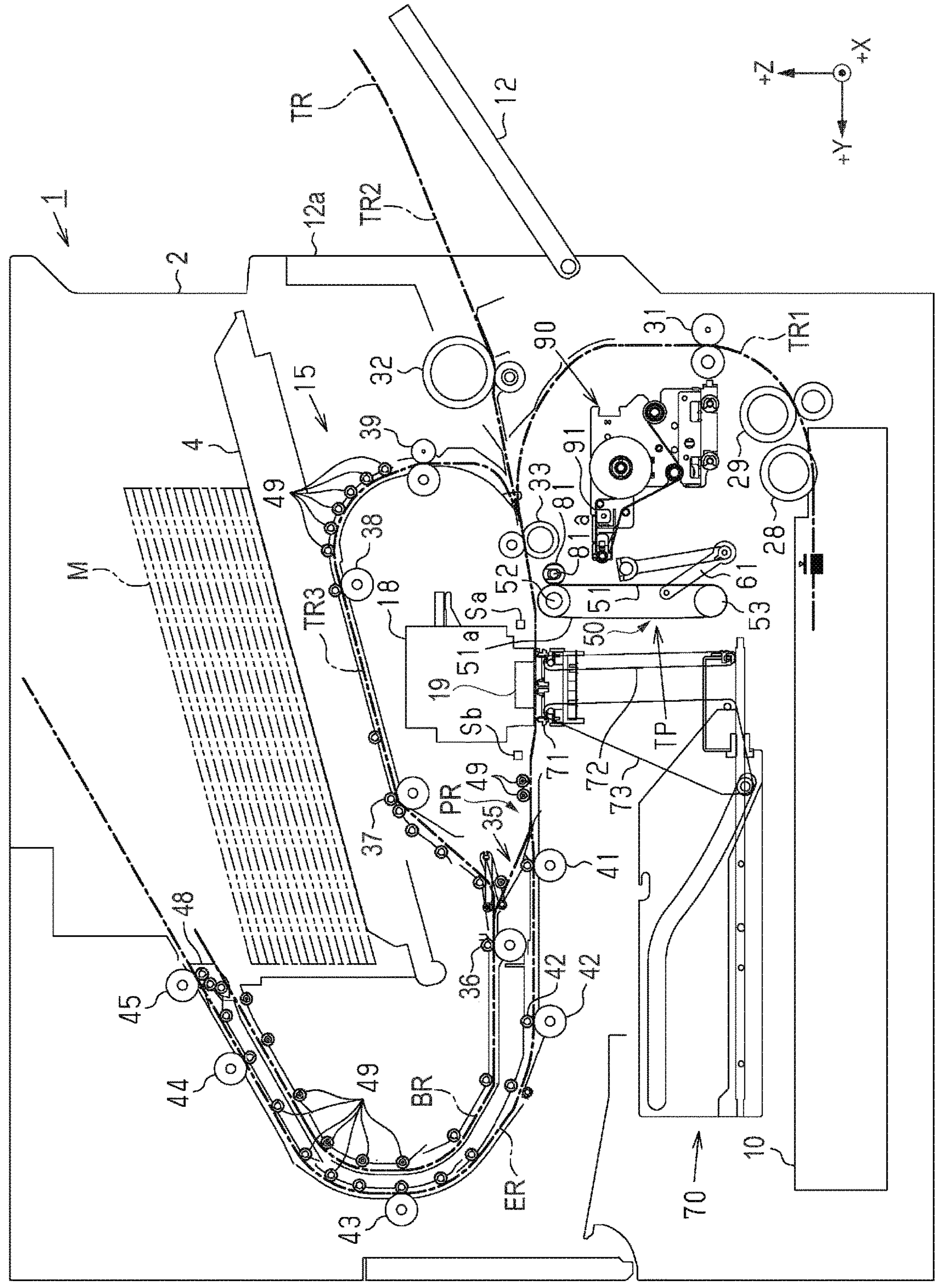
FIG. 3 is a diagram showing a cross sectional configuration of the printer.

The belt unit movement mechanism 60 rotates the transport belt unit 50. The belt unit movement mechanism 60 moves the transport belt 51 from the recording position KP to the retreat position TP. The retreat position TP is a position different from the recording position KP. The recording position KP shown in FIG. 2 is a position at which the transport surface 51*a* facing the printing unit 18 is parallel or substantially parallel with respect to the Y-axis. The transport belt unit 50 is in a horizontal posture at the recording position KP. The retreat position TP is a position different from the position at which the transport belt 51 faces the printing unit 18. As an example, the belt unit movement mechanism 60 pivots a driven roller 53 with a rotation center of a drive roller 52 as a fulcrum. The retreat position TP is shown in FIG. 3. The driven roller 53 pivots in the −Z direction and the −Y direction as indicated by an arrow of a two dot chain line. The belt unit movement mechanism 60 includes a link member 61 and a motor 63.

The link member 61 is connected to the transport belt unit 50. One end of the link member 61 is connected to a frame of the transport belt unit 50. The link member 61 pivots the transport belt unit 50 with the rotation center of the drive roller 52 as the fulcrum.

The motor 63 generates a driving force for driving the link member 61. The motor 63 is connected to the link member 61. By the motor 63 is rotationally drive, the link member 61 pivots the transport belt unit 50.

The head cleaning mechanism 70 performs capping or cleaning of the nozzle surface of the inkjet head 19. The head cleaning mechanism 70 includes a cap 71, a first support member 72, and a second support member 73. FIG. 2 shows a first state in which the head cleaning mechanism 70 does not face the inkjet head 19.

The belt cleaning mechanism 90 performs belt cleaning on the transport surface 51*a* of the transport belt 51. The belt cleaning mechanism 90 slides in the +Y direction or the −Y direction by a slide movement mechanism 98 (to be described later). The belt cleaning mechanism 90 is disposed at a position in the −Z direction and the −Y direction of the transport belt 51 positioned at the recording position KP. The belt cleaning mechanism 90 includes a cleaning cloth C. The belt cleaning mechanism 90 corresponds to an example of a cleaning unit. The cleaning cloth C corresponds to an example of a cleaning material. Details of the belt cleaning mechanism 90 will be described later.

FIG. 3 shows a cross sectional configuration of the printer 1. FIG. 3 shows a schematic configuration of the inside of the device main body 2. FIG. 3 shows the configuration of the printer 1 when the transport belt 51 is positioned at the retreat position TP. In the printer 1, the transport belt 51 can be belt cleaned by the belt cleaning mechanism 90. FIG. 3 shows the printer 1 in a state where the opening and closing cover 12 is opened. FIG. 3 shows a second state in which the head cleaning mechanism 70 faces the inkjet head 19. The configuration of the printer 1 shown in FIG. 3 is the same as the configuration of the printer 1 shown in FIG. 2. The position of the transport belt unit 50 and the position of the head cleaning mechanism 70 are different between FIGS. 2 and 3.

The retreat position TP of the transport belt 51 shown in FIG. 3 is a position obtained by pivoting the driven roller 53 by 90 degrees or substantially 90 degrees around the rotation center of the drive roller 52 as the fulcrum from the recording position KP. The transport belt unit 50 is in a vertical posture at the retreat position TP.

When the transport belt 51 is positioned at the retreat position TP, the head cleaning mechanism 70 moves to the position facing the printing unit 18. When the transport belt 51 is positioned at the retreat position TP, the head cleaning mechanism 70 is in the second state. The cap 71 faces the nozzle surface of the inkjet head 19.

The cap 71 covers the nozzles provided on the nozzle surface of the inkjet head 19. The cap 71 covers the nozzles by contact with the nozzle surface from the −Z direction of the inkjet head 19. The cap 71 suppresses drying of the ink in the inkjet head 19.

The cap 71 receives ink ejected from the nozzles of the inkjet head 19. When the cap 71 covers the nozzle surface, the printer 1 can perform flushing in which a predetermined amount of ink is ejected. The flushing is head cleaning for cleaning the inkjet head 19.

The first support member 72 and the second support member 73 movably support the cap 71. The first support member 72 and the second support member 73 move the cap 71 in the +Z direction and the −Z direction. The first support member 72 and the second support member 73 move the cap 71 in the +Z direction to bring the cap 71 in contact with the nozzle surface of the inkjet head 19. The first support member 72 and the second support member 73 may have a link mechanism or a cam mechanism (not shown). The first support member 72 and the second support member 73 may move the cap 71 by using the link mechanism or the cam mechanism.

The head cleaning mechanism 70 may include a cleaning blade (not shown). When the head cleaning mechanism 70 is in the second state, the cleaning blade is in contact with the nozzle surface of the inkjet head 19. The nozzle surface is cleaned by wiping the nozzle surface with the cleaning blade. The operation in which the cleaning blade wipes the nozzle surface is an example of head cleaning.

When the transport belt 51 is positioned at the retreat position TP, the belt cleaning mechanism 90 faces the transport belt 51. The belt cleaning mechanism 90 is moved from the standby position to the cleaning position in the +Y direction by the slide movement mechanism 98. When the belt cleaning mechanism 90 is moved to the cleaning position, the cleaning cloth C is in contact with the transport surface 51*a* of the transport belt 51. The belt cleaning mechanism 90 brings the cleaning cloth C in contact with the transport surface 51*a* to perform belt cleaning on the transport surface 51*a*. The belt cleaning mechanism 90 can remove ink adhering to the transport surface 51*a* of the transport belt 51. The cleaning position corresponds to an example of a contact position. The belt cleaning corresponds to an example of a cleaning operation.

The cleaning cloth C is in contact with the transport surface 51*a* of the rotating transport belt 51. When positioned at the retreat position TP, the transport belt 51 is rotated by a belt drive mechanism (not shown). The cleaning cloth C is in contact with the transport surface 51*a* of the rotating transport belt 51 to perform belt cleaning. The cleaning cloth C is made of a cloth such as a woven cloth. The cleaning cloth C is moved by a cleaning cloth transport mechanism (not shown). The cleaning cloth C is moved by the cleaning cloth transport mechanism when in contact with the transport surface 51*a*.

After performing the belt cleaning on the transport surface 51*a*, the belt cleaning mechanism 90 is moved to the standby position in the −Y direction by the slide movement mechanism 98. When the belt cleaning mechanism 90 moves to the standby position, the cleaning cloth C is not contact with the transport surface 51*a* of the transport belt 51. The standby position corresponds to an example of a non-contact position.

Figure 4:
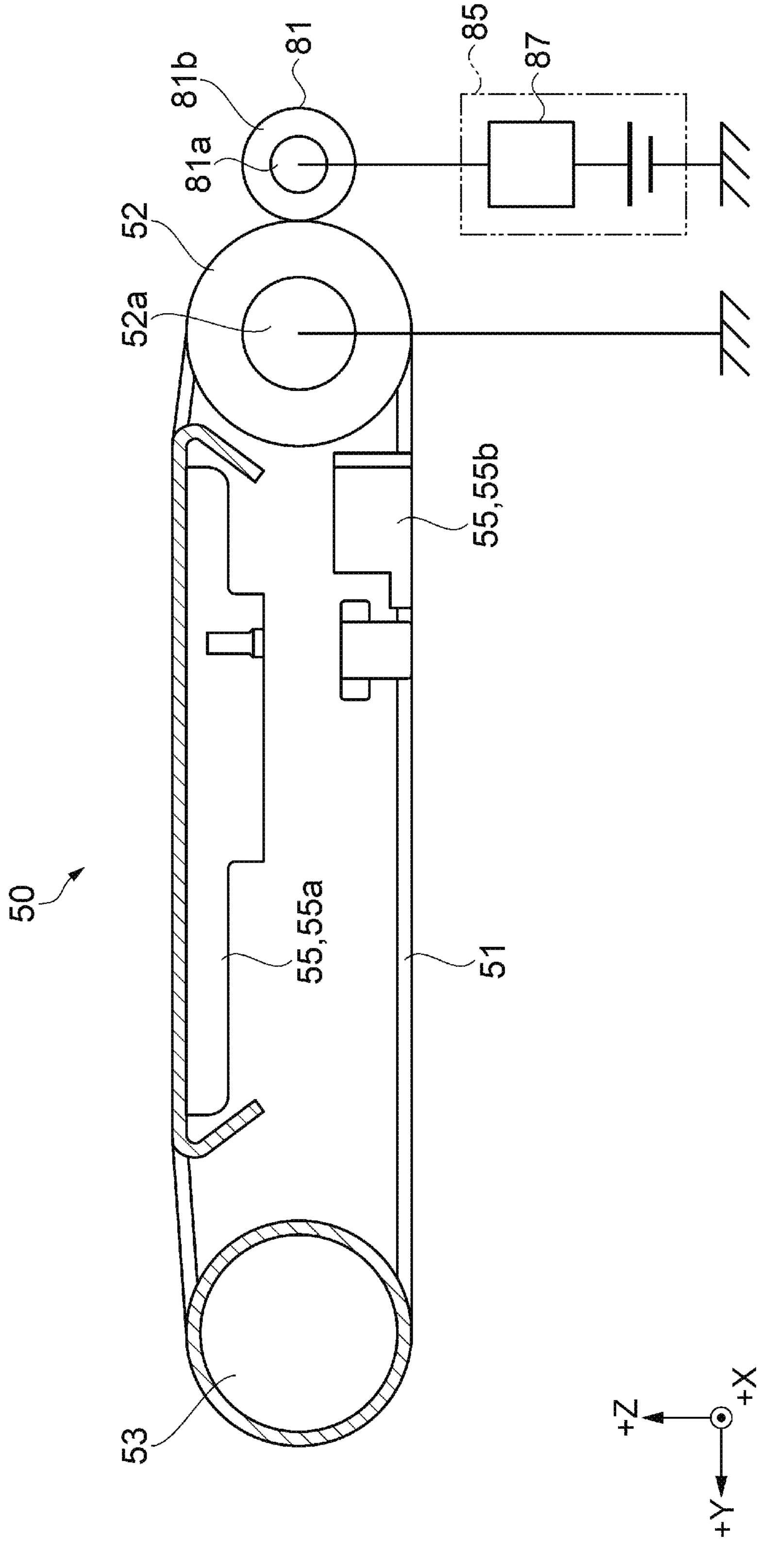
FIG. 4 is a diagram showing a schematic configuration of a transport belt unit.

FIG. 4 shows a schematic configuration of the transport belt unit 50. FIG. 4 shows configuration of the transport belt unit 50 at the recording position KP. The printing unit 18 is disposed at a position in the +Z direction of the transport belt 51 and faces the transport surface 51*a* of the transport belt 51. The transport belt unit 50 includes the drive roller 52, the driven roller 53, a belt support member 55, and a charging roller 81. The drive roller 52 and the driven roller 53 apply tension to the transport belt 51.

The drive roller 52 transmits a driving force to the transport belt 51. The drive roller 52 is connected to the belt drive mechanism (not shown). The drive roller 52 transmits the driving force generated by the belt drive mechanism to the transport belt 51. The transport belt 51 rotates in a predetermined direction by the transmitted driving force. The drive roller 52 has a drive roller shaft 52*a*. The drive roller shaft 52*a* is made of a conductive material. As an example, the drive roller shaft 52*a* is configured by metal shaft made of iron or the like. The drive roller shaft 52*a* is grounded.

The driven roller 53 winds the transport belt 51. The driven roller 53 is driven to rotate when the transport belt 51 rotates. The driven roller 53 moves in the −Z direction and the −Y direction with the rotation center of the drive roller 52 as the fulcrum. By movement of the driven roller 53, the transport belt 51 moves from the recording position KP to the retreat position TP.

The belt support member 55 supports the transport belt 51. The belt support member 55 supports the transport belt 51 from the inside of the transport belt 51 stretched between the drive roller 52 and the driven roller 53. The belt support member 55 includes a first belt support member 55*a* and a second belt support member 55*b*.

The first belt support member 55*a* supports the transport belt 51 at the position facing the printing unit 18. When the transport belt 51 is positioned at the recording position KP, the first belt support member 55*a* faces the printing unit 18 via the transport belt 51. The first belt support member 55*a* supports the transport belt 51 to which the print medium M is electrostatically attracted.

The second belt support member 55*b* supports the transport belt 51 at a position facing the belt cleaning mechanism 90. When the transport belt 51 is positioned at the retreat position TP, the second belt support member 55*b* faces the cleaning cloth C in contact with the transport belt 51 via the transport belt 51.

The charging roller 81 charges the transport belt 51. The charging roller 81 is in contact with the transport surface 51*a* of the transport belt 51 and charges the transport surface 51*a*. The charging roller 81 is driven to rotate in accordance with the rotation of the transport belt 51. The charging roller 81 is composed by a charging roller shaft 81*a* and a rubber layer 81*b*. The charging roller 81 may have a bearing section (not shown). The charging roller 81 corresponds to an example of a charging unit. The charging roller 81 is a roller member, but is not limited thereto. Instead of a roller member, a conductive blade or a conductive brush may be used.

The charging roller shaft 81*a* is made of a conductive member such as metal. A voltage is applied to the charging roller shaft 81*a* by a power supply section 85. As an example, an end section of the charging roller shaft 81*a* is in contact with a plate spring (not shown). The plate spring is connected to the power supply section 85. The plate spring is in contact with the end section of the charging roller shaft 81*a* and applies voltage thereto. The voltage may be applied to the charging roller shaft 81*a* via the bearing section. The bearing section is formed of a conductive resin, a conductive bearing such as a sintered bearing, or the like. By the transport belt 51 being charged by the charging roller 81, the print medium M is electrostatically attracted to the transport surface 51*a*. The transport belt 51 transports the print medium M to a position facing the inkjet head 19 by rotating. The charging roller 81 shown in FIG. 4 is disposed in the transport belt unit 50, but is not limited thereto. The charging roller 81 may be configured separately from the transport belt unit 50.

The power supply section 85 applies voltage to the charging roller 81. The power supply section 85 is electrically connected to the charging roller shaft 81*a*. The power supply section 85 may be configured in a power supply unit that supplies power to each unit of the printer 1, or may be provided separately from the power supply unit. The power supply section 85 includes a current detection section 87.

The current detection section 87 detects a charging current when the charging roller 81 charges the transport belt 51. The charging current corresponds to an example of a charging condition. The current detection section 87 detects the charging current before printing based on a print job is started. The current detection section 87 may detect the charging current after printing, based on the print job, is completed. The current detection section 87 detects the charging current in a state where the rotating transport belt 51 is charged by the charging roller 81. The current detection section 87 acquires, as the charging current, a maximum charging current or an average charging current acquired when the transport belt 51 is rotated a predetermined number of times. The current detection section 87 may measure the charging current after a paper jam occurs. The current detection section 87 corresponds to an example of a detection section.

Figure 5:
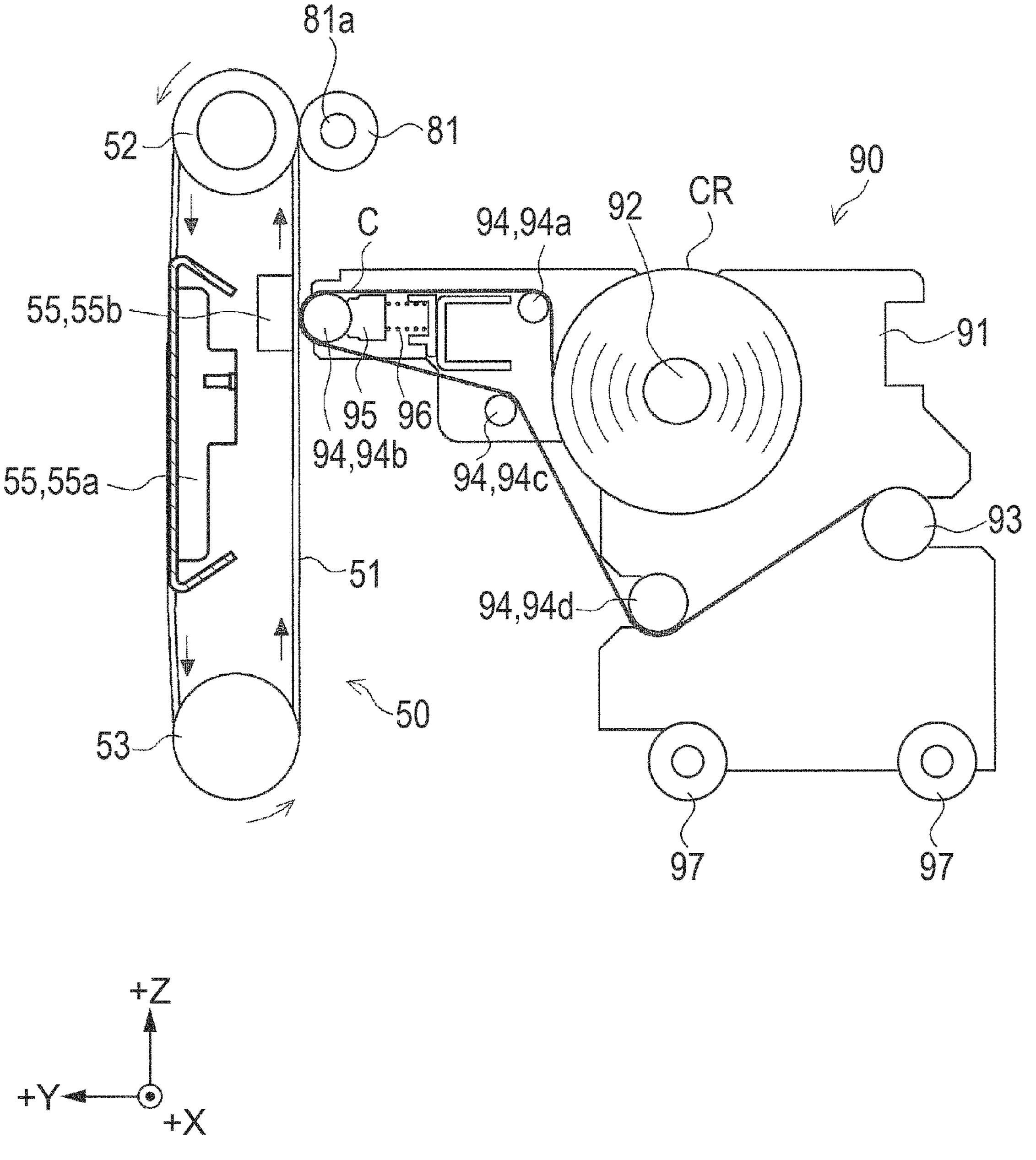
FIG. 5 is a diagram showing the transport belt unit and a belt cleaning mechanism.

FIG. 5 shows the transport belt unit 50 and the belt cleaning mechanism 90. FIG. 5 shows the relationship between the transport belt unit 50 and the belt cleaning mechanism 90 when belt cleaning is performed. FIG. 5 shows a state in which the belt cleaning mechanism 90 is positioned at the cleaning position by the slide movement mechanism 98. The transport belt 51 shown in FIG. 5 is positioned at the retreat position TP. The transport belt 51 is rotatable in the direction of arrow shown in FIG. 5. When the belt cleaning mechanism 90 performs belt cleaning of the transport belt 51, the transport belt 51 rotates in the direction of the arrow at a predetermined belt drive speed. The cleaning cloth C of the belt cleaning mechanism 90 is in contact with the transport surface 51*a* of the transport belt 51.

The belt cleaning mechanism 90 shown in FIG. 5 includes a housing 91, a roll shaft 92, a winding roller 93, a plurality of pulleys 94, a pressing member 95, a spring 96, and a plurality of rollers 97. A cleaning roll CR is attached to the belt cleaning mechanism 90. The cleaning roll CR is a roll of wound-up cleaning cloth C.

The housing 91 supports the roll shaft 92, the winding roller 93, the plurality of pulleys 94, the pressing member 95, the spring 96, and the plurality of rollers 97. The housing 91 is moved in the +Y direction or the −Y direction by the slide movement mechanism 98. The housing 91 is movable to the cleaning position or the standby position.

The roll shaft 92 rotatably supports the cleaning roll CR. The roll shaft 92 feeds out the cleaning cloth C from the supported cleaning roll CR toward the winding roller 93. The roll shaft 92 may be rotationally drive by a drive mechanism (not shown). The roll shaft 92 may be driven to rotate when the cleaning cloth C is fed out.

The winding roller 93 winds up the cleaning cloth C. The winding roller 93 winds the cleaning cloth C that has wiped the transport belt 51. The winding roller 93 is rotated by a drive mechanism (not shown) in a direction in which the cleaning cloth C is wound. The winding roller 93 is configured such that the wound cleaning cloth C can be taken out.

The plurality of pulleys 94 guide the cleaning cloth C fed out from the cleaning roll CR to the winding roller 93. The pulleys 94 may be rotationally driven by a drive mechanism (not shown) or may be driven to rotate. The belt cleaning mechanism 90 shown in FIG. 5 includes a first pulley 94*a*, a second pulley 94*b*, a third pulley 94*c*, and a fourth pulley 94*d*. The number of pulleys 94 is not limited to four. The belt cleaning mechanism 90 includes two or more pulleys 94.

The cleaning cloth C fed out from the cleaning roll CR wrap around the first pulley 94*a*. The first pulley 94*a* guides the cleaning cloth C toward the transport belt 51 in the +Y direction.

The cleaning cloth C guided by the first pulley 94*a* wraps around the second pulley 94*b*. The second pulley 94*b* is provided at a position facing the transport belt 51. The second pulley 94*b* is in contact with the transport belt 51 via the cleaning cloth C. The second pulley 94*b* brings the cleaning cloth C in contact with the transport belt 51. The cleaning cloth C in contact with the transport belt 51 performs belt cleaning by wiping the transport belt 51.

The third pulley 94*c* guides the cleaning cloth C that wiped the transport belt 51 by the second pulley 94*b*. The third pulley 94*c* guides the cleaning cloth C in the −Y direction. The third pulley 94*c* applies tension to the cleaning cloth C.

The fourth pulley 94*d* guides the cleaning cloth C guided by the third pulley 94*c* toward the winding roller 93. The fourth pulley 94*d* guides the cleaning cloth C in the −Y direction. The fourth pulley 94*d* applies tension to the cleaning cloth C.

The pressing member 95 presses the second pulley 94*b*. The pressing member 95 is in contact with the second pulley 94*b* and presses the second pulley 94*b* toward the transport belt 51. The second pulley 94*b* is pressed by the pressing member 95 to press the cleaning cloth C against the transport belt 51.

The spring 96 applies a pressing force to the pressing member 95. The spring 96 applies the pressing force to the pressing member 95 to press the pressing member 95 against the second pulley 94*b*. The pressing force applied by the spring 96 is appropriately set. The belt cleaning mechanism 90 shown in FIG. 5 is provided with the spring 96, but is not limited thereto. The configuration is not limited as long as it is configured to apply pressing force to the pressing member 95.

The rollers 97 slide movement the belt cleaning mechanism 90 in the +Y direction or the −Y direction. When the driving force is transmitted to the belt cleaning mechanism 90 by the slide movement mechanism 98, the rollers 97 slidingly move the belt cleaning mechanism 90. The rollers 97 slidingly move the belt cleaning mechanism 90 by rotating on a rail member (not shown).

Figure 6:
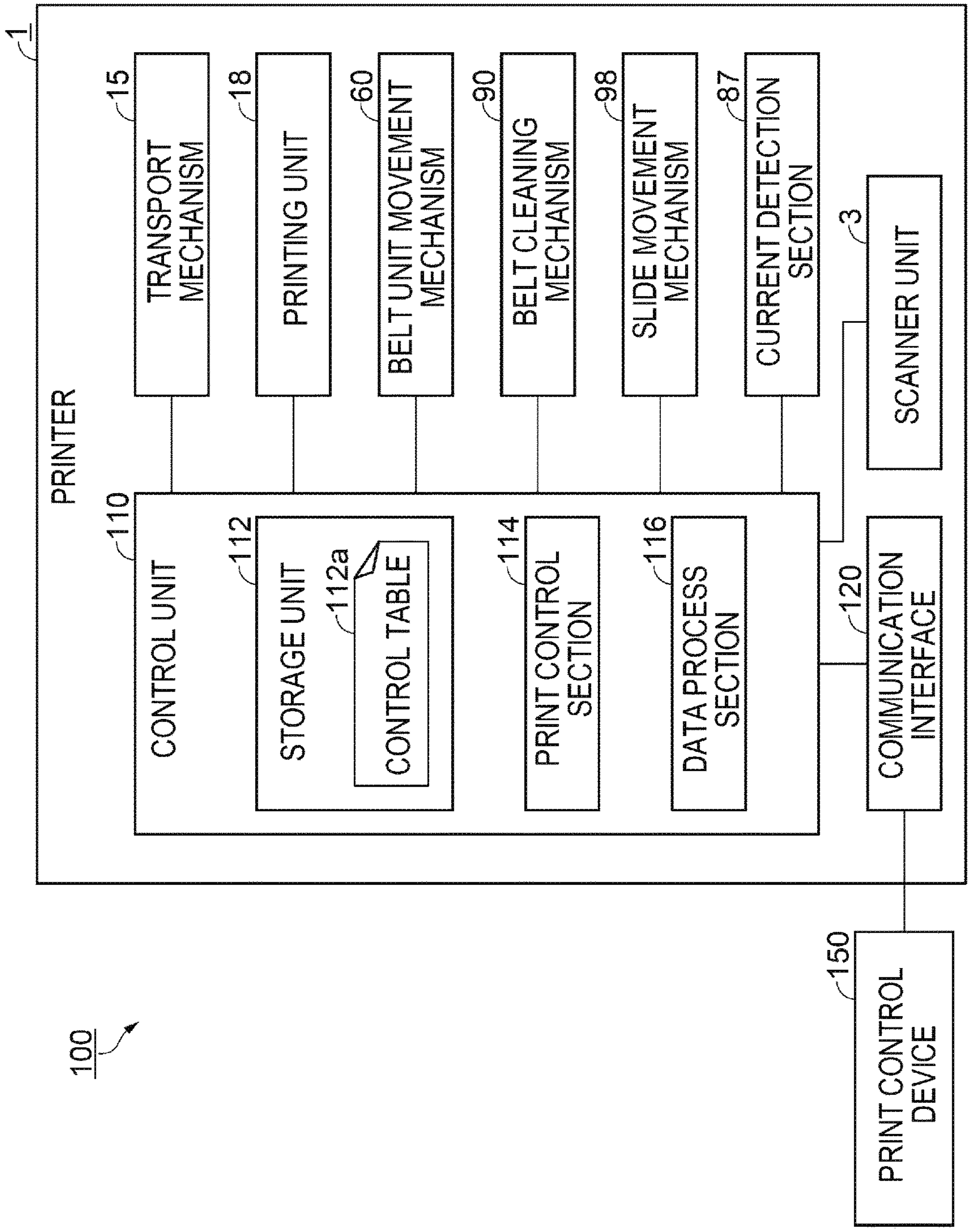
FIG. 6 is a diagram showing a block configuration of a printing system.

FIG. 6 shows a block configuration of the printing system 100. The printing system 100 is composed of the printer 1 and a print control device 150. The printer 1 is communicably connected to the print control device 150.

The printer 1 includes the scanner unit 3, the transport mechanism 15, the printing unit 18, the belt unit movement mechanism 60, the belt cleaning mechanism 90, the slide movement mechanism 98, a control unit 110, and a communication interface 120. The printer 1 may be provided with the current detection section 87. The control unit 110 controls operations of the scanner unit 3, the transport mechanism 15, the printing unit 18, the belt unit movement mechanism 60, the belt cleaning mechanism 90, the slide movement mechanism 98, the current detection section 87, and the communication interface 120.

The scanner unit 3 reads the document based on the control of the control unit 110. The scanner unit 3 generates read data by reading the document. The scanner unit 3 transmits the generated read data to the control unit 110. The control unit 110 generates the print job based on the received read data. The print job includes the print data corresponding to one sheet of print medium M, various commands, and various printing conditions.

The transport mechanism 15 transports the print medium M to the transport path TR based on the control of the control unit 110. The transport mechanism 15 appropriately drives the plurality of roller pairs, the transport belt 51, and the like based on the control of the control unit 110. The transport belt 51, which is a part of the transport mechanism 15, rotates at the predetermined belt drive speed based on control of the control unit 110. When the belt cleaning mechanism 90 performs belt cleaning on the transport surface 51*a* of the transport belt 51, the transport belt 51 rotates based on the control of the control unit 110. The belt drive speed, the belt drive time, and the like of the transport belt 51 is controlled by the control unit 110.

The transport mechanism 15 includes the first sensor Sa and the second sensor Sb. The first sensor Sa and the second sensor Sb function as a paper jam detection section. The first sensor Sa and the second sensor Sb detect a paper jam of the print medium M based on the detection timing of the print medium M. The first sensor Sa and the second sensor Sb detect a paper jam of the print medium M by detecting the print medium M transported in the transport path TR. When the first sensor Sa and the second sensor Sb detect a paper jam, the first sensor Sa and the second sensor Sb transmit a paper jam detection signal to the control unit 110. When the first sensor Sa and the second sensor Sb detect a paper jam, the transport mechanism 15 stops transport of the print medium M.

The printing unit 18 performs printing on the print medium M based on the control of the control unit 110. The printing unit 18 performs printing based on the print job. The printing unit 18 prints one sheet of print medium M based on the print data included in the print job. The print job may have a plurality of print data sets. The inkjet head 19 ejects ink onto the print medium M based on the control of the control unit 110. The printing unit 18 performs printing by ejecting ink onto the printing medium M by the inkjet head 19.

The belt unit movement mechanism 60 pivots the transport belt unit 50 based on the control of the control unit 110. The belt unit movement mechanism 60 moves the transport belt 51 to the recording position KP or the retreat position TP by pivoting the transport belt unit 50.

The belt cleaning mechanism 90 performs belt cleaning on the transport belt 51 based on the control of the control unit 110. In the belt cleaning, the cleaning cloth C is in contact with the transport surface 51*a* to wipe the transport surface 51*a*. When the belt cleaning mechanism 90 performs belt cleaning, the control unit 110 rotates the transport belt 51 at the predetermined belt drive speed. When the belt cleaning mechanism 90 performs belt cleaning, a belt cleaning condition such as a cleaning cloth movement speed or the like are controlled by the control unit 110.

The slide movement mechanism 98 slides the belt cleaning mechanism 90 in the +Y direction or the −Y direction based on the control of the control unit 110. The slide movement mechanism 98 moves the belt cleaning mechanism 90 to the cleaning position or the standby position.

The current detection section 87 detects the charging current based on the control of the control unit 110. The current detection section 87 transmits the detected charging current to the control unit 110. The control unit 110 discriminates a transport surface state based on the received charging current. The transport surface state corresponds to an example of a surface state.

The control unit 110 is a controller that controls the operation of the printer 1. As an example, the control unit 110 is a processor having a central processing unit (CPU). The control unit 110 may be composed of one or a plurality of processors. The control unit 110 shown in FIG. 6 includes a storage unit 112. The storage unit 112 may be provided separately from the control unit 110. The control unit 110 functions as a print control section 114 and a data process section 116 by executing a control program. The control unit 110 corresponds to an example of a control section. The storage unit 112 stores various data, various tables, various programs, and the like. The storage unit 112 stores the print job based on the read data generated by the scanner unit 3. The storage unit 112 stores the print job received via the communication interface 120. The storage unit 112 stores various data generated by the data process section 116. The storage unit 112 stores the control program that operates in the control unit 110. The storage unit 112 is configured by a read only memory (ROM), a random access memory (RAM), or the like. The storage unit 112 may function as a work area of the control unit 110. The storage unit 112 corresponds to an example of a storage unit.

The storage unit 112 stores a control table 112*a*. The control table 112*a* is used to determine the belt cleaning condition for the belt cleaning performed by the belt cleaning mechanism 90. The control table 112*a* associates a comparison value with a condition value included in the belt cleaning condition. The comparison value corresponds to the transport surface state. The comparison value includes a threshold value. The condition values included in the belt cleaning condition are a belt cleaning time, the belt drive speed, and the like. Details of the control table 112*a* will be described later.

The print control section 114 controls operations of various mechanisms and various units. The print control section 114 controls the scanner unit 3, the transport mechanism 15, the printing unit 18, the belt unit movement mechanism 60, the belt cleaning mechanism 90, the slide movement mechanism 98, and the communication interface 120. The print control section 114 may control the current detection section 87.

The print control section 114 executes printing on the print medium M by controlling the transport mechanism 15 and the printing unit 18. The print control section 114 receives a print request input to the control panel 5 or the like. The print control section 114 operates the transport mechanism 15 and the printing unit 18, based on the received print request. The print control section 114 executes printing on the print medium M by operating the transport mechanism 15 and the printing unit 18.

The print control section 114 receives a paper jam detection signal from the transport mechanism 15. When receiving a paper jam detection signal, the print control section 114 stops transport of the print medium M by the transport mechanism 15. When receiving a paper jam detection signal, the print control section 114 stops printing by the printing unit 18. When receiving a paper jam release signal from the control panel 5 or the like, the print control section 114 causes each unit to execute a post process. A paper jam release signal is generated when the user performs a predetermined operation input on the control panel 5 or the like. The post process to be executed includes head cleaning by the head cleaning mechanism 70 and belt cleaning by the belt cleaning mechanism 90.

The print control section 114 moves the transport belt 51 to the recording position KP or the retreat position TP by controlling the belt unit movement mechanism 60. The print control section 114 slides the belt cleaning mechanism 90 from the standby position to the cleaning position by controlling the slide movement mechanism 98.

The print control section 114 performs belt cleaning on the transport belt 51 by controlling the belt cleaning mechanism 90. When the transport belt unit 50 is positioned at the retreat position TP, the print control section 114 rotates the transport belt 51 at the predetermined belt drive speed. When the transport belt unit 50 is positioned at the retreat position TP, the print control section 114 causes the cleaning cloth C to contact the transport belt 51. The print control section 114 performs belt cleaning on the transport belt 51 by contacting the cleaning cloth C to the rotating transport belt 51. The print control section 114 causes the belt cleaning mechanism 90 to execute the belt cleaning under the belt cleaning condition determined by the data process section 116. The print control section 114 corresponds to an example of a control section.

The data process section 116 discriminates the transport surface state of the transport belt 51. The data process section 116 receives the print job and discriminates the transport surface state based on the print job. The data process section 116 acquires the print data, the printing conditions, and the like included in the print job. The print data is data corresponding to one sheet of print medium M. The printing condition includes the size of the print medium M, single-sided/double-sided printing, the type of ink to be ejected, and the like. By using the print data, the data process section 116 may calculate the number of dots to be printed on the print medium M, an ink amount to be ejected onto the print medium M, a print duty value, a total ink amount, which is a total amount of ink to be ejected, and the like. The data process section 116 discriminates the transport surface state based on the print data and the printing condition. The data process section 116 can accurately discriminate contamination by ink or the like on the transport surface 51*a*. The print data and the printing condition correspond to an example of a recording condition. The data process section 116 corresponds to an example of a discrimination section.

As an example, the data process section 116 discriminates the transport surface state by calculating the print duty value. The print duty value is a value acquired by dividing the number of dot occurrences by the maximum number of dots. The number of generated dots is the number of dot occurrences to be printed per unit area based on the print data. The maximum number of dots is the maximum number of dots that can be printed by the printing unit 18 per unit area. The print duty value is calculated by the following equation.

$$\text{Print duty value (\%)} = \text{number of dot occurrences} / \text{maximum number of dots} \times 100$$

When receiving the paper jam detection signal from the transport mechanism 15, the data process section 116 discriminates the transport surface state. The print duty value is calculated based on the print data corresponding to the print medium M which is scheduled to be printed at a timing when the paper jam occurs. The data process section 116 discriminates the transport surface state by comparing the calculated print duty value with the control table 112*a*. The print duty value corresponds to an example of a print duty.

The data process section 116 may discriminate the transport surface state based on the charging current detected by the current detection section 87. The data process section 116 receives the charging current detected by the current detection section 87. The data process section 116 determines the transport surface state, by comparing the received charging current with the control table 112*a*. When the transport surface 51*a* is contaminated with ink, paper powder, or the like, the charging current increases. The data process section 116 can discriminate the transport surface state by comparing the detected charging current with the control table 112*a*.

The data process section 116 determines the belt cleaning condition in accordance with the discriminated transport surface state. The data process section 116 changes the belt cleaning condition according to the transport surface state. The data process section 116 changes the cleaning strength by changing the belt cleaning condition. The data process section 116 causes the print control section 114 to execute the belt cleaning under the determined belt cleaning condition. The print control section 114 causes the belt cleaning mechanism 90 to perform the belt cleaning under the determined belt cleaning condition. The print control section 114 causes the belt cleaning mechanism 90 to perform the belt cleaning in accordance with the transport surface state of the transport belt 51.

The communication interface 120 transmits or receives various data and various programs. The communication interface 120 is communicatively connected to the external device such as the print control device 150. The communication interface 120 connects to the external device in a wired or wireless manner in accordance with a predetermined communication protocol. The communication interface 120 receives the print job from the print control device 150. The communication interface 120 transmits a print result or the like of the print job to the print control device 150.

The print control device 150 is connected to the communication interface 120. The print control device 150 is a computer on which a printer driver operates. The print control device 150 generates the print job. The print control device 150 transmits the generated print job to the communication interface 120. The communication interface 120 transmits the received print job to the control unit 110.

The printer 1 for printing on the print medium M includes the printing unit 18 for printing by ejecting ink onto the print medium M, the transport belt 51 for transporting the print medium M printed by the printing unit 18, the belt cleaning mechanism 90 movable to the cleaning position contacting the transport belt 51 and the standby position not contacting the transport belt 51 and cleaning the transport belt 51 when positioned at the cleaning position, the data process section 116 for discriminating the transport surface state of the transport belt 51, and the print control section 114 for causing the belt cleaning mechanism 90 to perform belt cleaning according to the transport surface state of the transport belt 51 discriminated by the data process section 116.

The printer 1 can perform belt cleaning corresponding to a contamination state of the transport surface 51*a* of the transport belt 51.

The data process section 116 acquires the print data and the printing condition of printing performed by the printing unit 18, and discriminates the transport surface state by the acquired printing data and the printing condition.

The printer 1 can accurately discriminate the contamination state of the transport surface 51*a* of the transport belt 51.

Figures 7, 8:
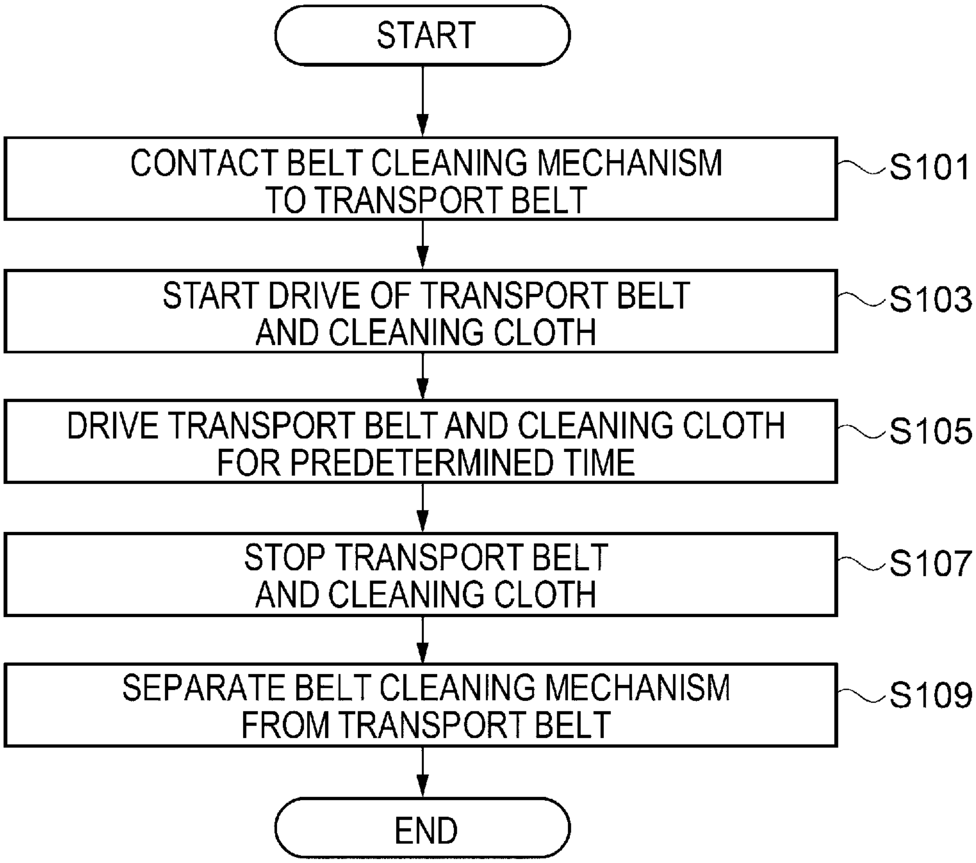
FIG. 7 is a diagram showing a flowchart of belt cleaning performed in the printer.
FIG. 8 is a diagram showing an example of a control table.

FIG. 7 shows a flowchart of belt cleaning performed in the printer 1. FIG. 7 shows a belt cleaning control method executed by the printer 1. The belt cleaning control method corresponds to an example of a control method. The belt cleaning is performed in the post process after the paper jam release signal is received. The belt cleaning may be performed before or after printing of the print job. The belt cleaning is performed after the transport belt 51 has moved to the retreat position TP.

In step S101, the control unit 110 brings the belt cleaning mechanism 90 into contact with the transport belt 51. The control unit 110 controls the slide movement mechanism 98 to move the belt cleaning mechanism 90 to the cleaning position. When the belt cleaning mechanism 90 is moved to the cleaning position, the cleaning cloth C contacts the transport surface 51*a* of the transport belt 51.

After bringing the belt cleaning mechanism 90 into contact with the transport belt 51, the control unit 110 starts drive of the transport belt 51 and the cleaning cloth C in step S103. The print control section 114 rotates the transport belt 51 in a predetermined direction. After rotating the transport belt 51, the print control section 114 transports the cleaning cloth C at a predetermined cleaning cloth transport speed. The cleaning cloth C may not be transported. The cleaning cloth C may wipe the transport surface 51*a* of the transport belt 51 in a stopped state.

In step S105, the control unit 110 drives the transport belt 51 and the cleaning cloth C for a predetermined time. The control unit 110 causes the transport belt 51 and the belt cleaning mechanism 90 to perform belt cleaning for the predetermined time. The print control section 114 rotates the transport belt 51 at the predetermined belt drive speed. When the cleaning cloth C is transported, the print control section 114 transports the cleaning cloth C at the predetermined cleaning cloth transport speed. The belt cleaning condition includes the belt cleaning time for performing belt cleaning, the belt drive speed of the transport belt 51, and a cleaning cloth transporting amount of the cleaning cloth C. The belt cleaning time, the belt drive speed, and the cleaning cloth transport amount are adjusted according to the transport surface state discriminated by the data process section 116. The print control section 114 causes the belt cleaning mechanism 90 to perform belt cleaning according to the transport surface state.

After performing the belt cleaning for the predetermined time, the control unit 110 stops the transport belt 51 and the cleaning cloth C in step S107. The print control section 114 stops rotation of the transport belt 51. In the case that the cleaning cloth C is transported, the print control section 114 stops transport of the cleaning cloth C.

After stopping the transport belt 51 and the cleaning cloth C, the control unit 110 separates the belt cleaning mechanism 90 from the transport belt 51 in step S109. The print control section 114 controls the slide movement mechanism 98 to separate the belt cleaning mechanism 90 from the transport belt 51. The print control section 114 moves the belt cleaning mechanism 90 from the cleaning position to the standby position. The print control section 114 moves the belt cleaning mechanism 90 to the standby position and ends belt cleaning.

The belt cleaning control method of the printer 1 that performs printing on the print medium M performs printing by transporting the print medium M by the transport belt 51 and ejecting ink onto the print medium M on the transport belt 51, the transport surface state of the transport belt 51 is discriminated, the belt cleaning mechanism 90 is moved from the standby position not in contact with the transport belt 51 to the cleaning position in contact with the transport belt 51, and the belt cleaning mechanism 90 in contact with the transport belt 51 is made to execute belt cleaning corresponding to the transport surface state.

The printer 1 can perform belt cleaning according to the contamination state of the transport surface 51*a* of the transport belt 51.

First Embodiment

In a first embodiment, the data process section 116 determines the belt cleaning condition using the print duty value. The storage unit 112 stores the control table 112*a* shown in FIG. 8. The data process section 116 determines the belt cleaning condition using the control table 112*a* shown in FIG. 8. The print control section 114 causes the belt cleaning mechanism 90 to execute belt cleaning under the determined belt cleaning condition.

FIG. 8 shows an example of the control table 112*a*. FIG. 8 associates print duty range with belt cleaning time. The print duty range included in the control table 112*a* is the comparison value to be compared with the print duty value calculated by the data process section 116. The belt cleaning time is included in the belt cleaning condition. The belt cleaning time corresponds to an example of an execution time.

The print duty range included in the control table 112*a* is divided into four ranges by thresholds. The print duty range is divided into 20% or less, 21% to 40%, 41% to 60%, and 61% or more depending on the threshold value. The print duty range values 20%, 40%, and 60% are thresholds. The values 20%, 40% and 60% of the print duty range are a first threshold, a second threshold, and a third threshold, respectively. The values 21%, 41% and 61% in the print duty range shown in FIG. 8 indicate larger than the first threshold, the second threshold, and the third threshold, respectively. The four sections each corresponds to a transport surface state of the transport belt 51. The data process section 116 can discriminate the transport surface state by comparing the print duty value calculated based on the print data included in the print job with a threshold or a print duty range in the control table 112*a*. The print duty range is not limited to four sections. The number of sections of the print duty range is appropriately set.

The plurality of belt cleaning times included in the control table 112*a* correspond to four divided print duty ranges. The belt cleaning times of 20 seconds, 30 seconds, 45 seconds, and 90 seconds are a first belt cleaning time, a second belt cleaning time, a third belt cleaning time, and a fourth belt cleaning time, respectively. The data process section 116 acquires the belt cleaning time corresponding to the print duty value calculated based on the print data. The data process section 116 generates the belt cleaning condition including the acquired belt cleaning time.

Figure 9:
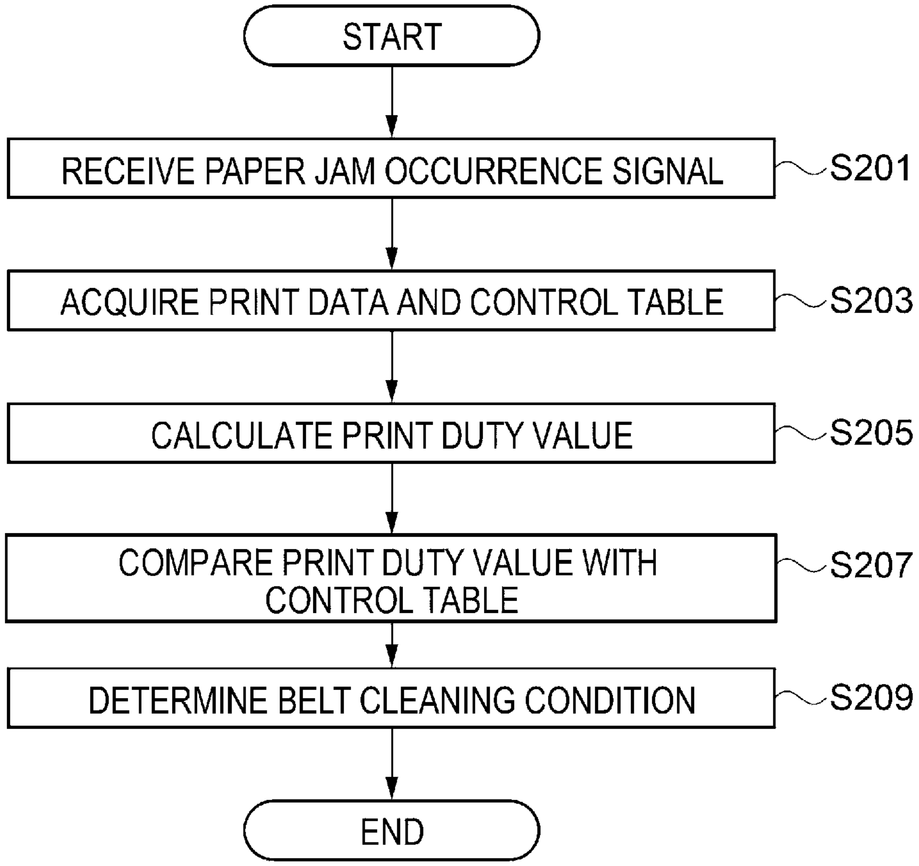
FIG. 9 is a diagram showing a flowchart of determining a belt cleaning condition.

FIG. 9 shows a flowchart for determining belt cleaning condition. FIG. 9 shows a flow of determining the belt cleaning condition by the control unit 110. The control unit 110 determines the belt cleaning condition using the control table 112*a* shown in FIG. 8. The control unit 110 determines the belt cleaning condition by generating the belt cleaning condition.

The control unit 110 receives a paper jam occurrence signal in step S201. The print control section 114 receives the paper jam occurrence signal from the transport mechanism 15. The print control section 114 stops the transport mechanism 15.

When the control unit 110 receives the paper jam occurrence signal, the control unit 110 acquires the print data and the control table 112*a* in step S203. The data process section 116 acquires the print data and the control table 112*a* stored in the storage unit 112. The print data is included in the print job. The data process section 116 may acquire the print data and the control table 112*a* in advance before receiving the paper jam occurrence signal.

The control unit 110 calculates the print duty value in step S205. The data process section 116 calculates the print duty value based on the print data. The calculated print duty value is calculated based on the print data to be printed on the print medium M that jammed. The print duty value may be calculated based on the print data corresponding to the print medium M printed from the start of printing to the occurrence of the paper jam.

After calculating the print duty value, the control unit 110 compares the calculated print duty value with the control table 112*a* in step S207. The data process section 116 compares the calculated print duty value with the print duty range included in the control table 112*a*. The data process section 116 discriminates the transport surface state by comparing the calculated print duty value with the print duty range included in the control table 112*a*. A flow in which the data process section 116 determines the belt cleaning time will be described later.

In step S209, the control unit 110 determines the belt cleaning condition. The data process section 116 compares the calculated print duty value with the control table 112*a* to acquire the belt cleaning time. The belt cleaning time is included in the belt cleaning condition. The data process section 116 generates the belt cleaning condition including the acquired belt cleaning time. The data process section 116 transmits the belt cleaning condition including the belt cleaning time to the print control section 114. The print control section 114 causes the belt cleaning mechanism 90 to execute the belt cleaning of the received belt cleaning condition.

Figure 10:
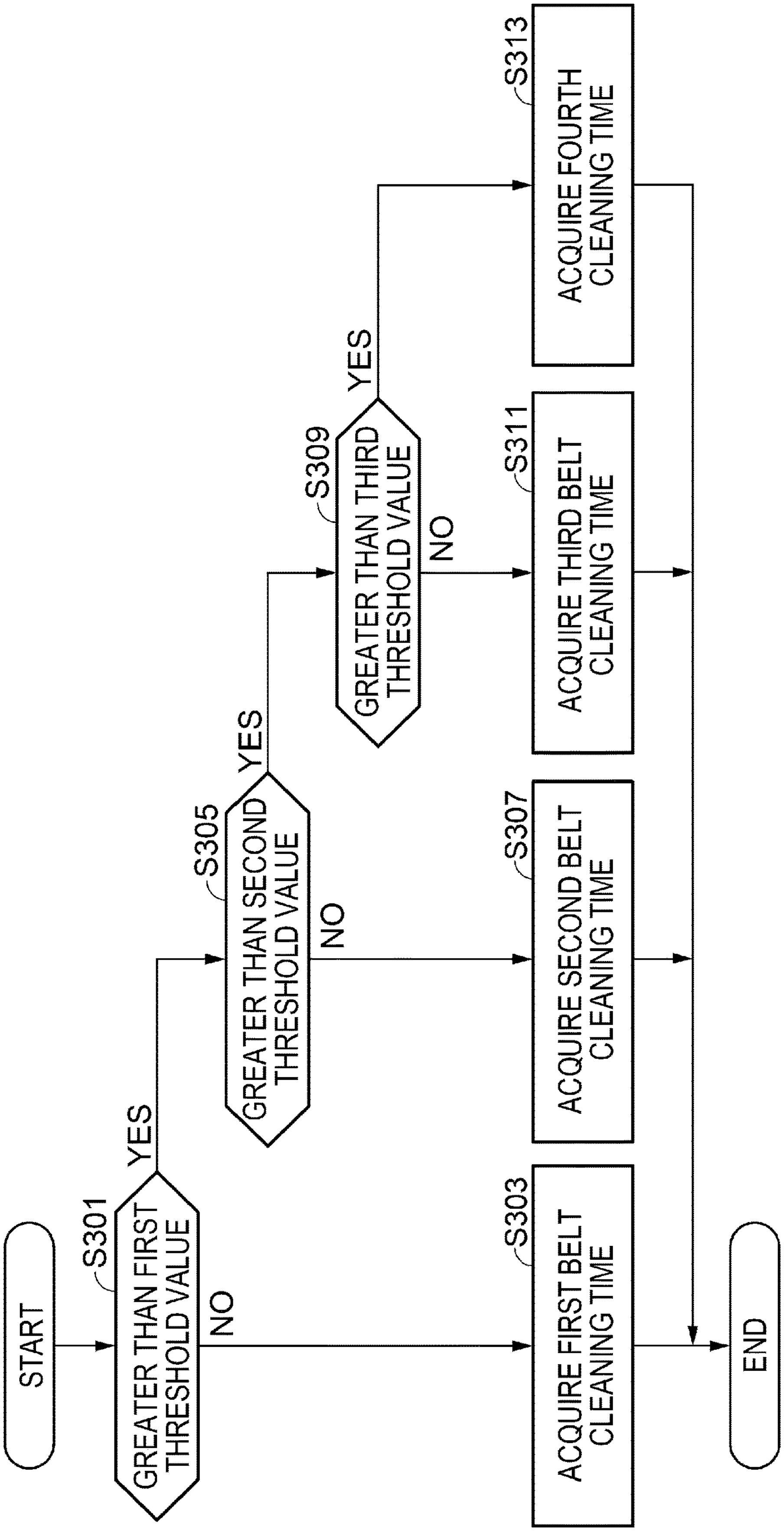
FIG. 10 is a diagram showing a flowchart of determining the belt cleaning condition.

FIG. 10 shows a flowchart for determining belt cleaning condition. FIG. 10 shows details of step S207 of FIG. 9. FIG. 10 shows a flow of acquiring the belt cleaning time using each threshold value included in the control table 112*a*.

Upon calculating the print duty value, the control unit 110 compares the calculated print duty value with the first threshold included in the control table 112*a* in step S301. In the case of the control table 112*a* shown in FIG. 8, the first threshold is 20%. The data process section 116 evaluates whether or not the calculated print duty value is larger than the first threshold. When the calculated print duty value is equal to or less than the first threshold, the data process section 116 discriminates that the calculated print duty value is within the print duty range of 0 to 20%. The data process section 116 discriminates that the transport surface 51*a* is in a first transport surface state. The first transport surface state is a state in which contamination by ink or the like is small. When the calculated print duty value is equal to or less than the first threshold, the control unit 110 proceeds to step S303 (step S301: NO). When the calculated print duty value is larger than the first threshold, the control unit 110 proceeds to step S305 (step S301: YES). The calculated print duty value is an example of the printing condition. The calculated print duty value corresponds to an example of the print duty. The first threshold corresponds to an example of a print duty threshold. The first transport surface state corresponds to an example of a first surface state.

In step S303, the control unit 110 acquires the first belt cleaning time. The data process section 116 acquires the first belt cleaning time included in the control table 112*a*. In the case of the control table 112*a* shown in FIG. 8, the first belt cleaning time is 20 seconds. The data process section 116 discriminates that the belt cleaning time for performing the belt cleaning on the transport surface 51*a* in the first transport surface state is the first belt cleaning time. The data process section 116 generates a first belt cleaning condition including the acquired first belt cleaning time. The first belt cleaning time corresponds to an example of a first time. The first belt cleaning condition corresponds to an example of a first condition.

In step S305, the control unit 110 compares the calculated print duty value with the second threshold included in the control table 112*a*. In the case of the control table 112*a* shown in FIG. 8, the second threshold is 40%. The data process section 116 evaluates whether or not the calculated print duty value is larger than the second threshold. When the calculated print duty value is equal to or less than the second threshold, the data process section 116 discriminates that the calculated print duty value is within range of the print duty range of 21% to 40%. The data process section 116 discriminates that the transport surface 51*a* is in a second transport surface state. The second transport surface state is a state in which there is more contamination by ink or the like than in the first transport surface state. When the calculated print duty value is equal to or less than the second threshold, the control unit 110 proceeds to step S307 (step S305: NO). When the calculated print duty value is larger than the second threshold, the control unit 110 proceeds to step S309 (step S305: YES). The second threshold corresponds to an example of the print duty threshold. The second transport surface state corresponds to an example of a second surface state.

In step S307, the control unit 110 acquires the second belt cleaning time. The data process section 116 acquires the second belt cleaning time included in the control table 112*a*. In the case of the control table 112*a* shown in FIG. 8, the second belt cleaning time is 30 seconds. The second belt cleaning time is different from the first belt cleaning time. The data process section 116 discriminates that the belt cleaning time for performing the belt cleaning on the transport surface 51*a* in the second transport surface state is the second belt cleaning time. The data process section 116 generates a second belt cleaning condition including the acquired second belt cleaning time. The generated second belt cleaning condition is different from the first belt cleaning condition. The generated second belt cleaning condition is longer than the first belt cleaning condition. The second belt cleaning time corresponds to an example of a second time. The second belt cleaning condition corresponds to an example of a second condition.

In step S309, the control unit 110 compares the calculated print duty value with the third threshold included in the control table 112*a*. In the case of the control table 112*a* shown in FIG. 8, the third threshold is 60%. The data process section 116 evaluates whether or not the calculated print duty value is larger than the third threshold. When the calculated print duty value is equal to or less than the third threshold, the data process section 116 discriminates that the calculated print duty value is within range of the print duty range of 41 to 60%. The data process section 116 discriminates that the transport surface 51*a* is in a third transport surface state. The third transport surface state is a state in which there is more contamination by ink or the like than in the first transport surface state and the second transport surface state. When the calculated print duty value is larger than the third threshold, the data process section 116 discriminates that the calculated print duty value is greater than or equal to 61%. The data process section 116 discriminates that the transport surface 51*a* is in a fourth transport surface state. The fourth transport surface state is a state in which there is more contamination by ink or the like than in the first transport surface state, the second transport surface state, and the third transport surface state. When the calculated print duty value is equal to or less than the third threshold, the control unit 110 proceeds to step S311 (step S309: NO). When the calculated print duty value is larger than the third threshold, the control unit 110 proceeds to step S313 (step S309: YES). The third threshold corresponds to an example of the print duty threshold.

In step S311, the control unit 110 acquires the third belt cleaning time. The data process section 116 acquires the third belt cleaning time included in the control table 112*a*. In the case of the control table 112*a* shown in FIG. 8, the third belt cleaning time is 45 seconds. The third belt cleaning time is different from the first belt cleaning time and the second belt cleaning time. The data process section 116 discriminates that the belt cleaning time for performing the belt cleaning on the transport surface 51*a* in the third transport surface state is the third belt cleaning time. The data process section 116 generates a third belt cleaning condition including the acquired third belt cleaning time. The generated third belt cleaning condition is different from the first belt cleaning condition and the second belt cleaning condition.

In step S313, the control unit 110 acquires the fourth belt cleaning time. The data process section 116 acquires the fourth belt cleaning time included in the control table 112*a*. In the case of the control table 112*a* shown in FIG. 8, the fourth belt cleaning time is 90 seconds. The fourth belt cleaning time is different from the first belt cleaning time, the second belt cleaning time, and the third belt cleaning time. The data process section 116 discriminates that the belt cleaning time for performing the belt cleaning on the transport surface 51*a* in the fourth transport surface state is the fourth belt cleaning time. The data process section 116 generates a fourth belt cleaning condition including the acquired fourth belt cleaning time. The generated fourth belt cleaning condition is different from the first belt cleaning condition, the second belt cleaning condition, and the third belt cleaning condition.

The print data and the printing condition are print duty values when printing is performed on the print medium M by the printing unit 18, and the transport surface state is discriminated by comparing the print duty value with the thresholds stored in advance.

The print duty value corresponds to the amount of ink ejected by the printing unit 18. The printer 1 can discriminate the contamination state of the transport belt 51 based on the amount of ink that is ejected. The printer 1 can accurately acquire the belt cleaning condition.

The data process section 116 discriminates that the transport surface state is the first transport surface state when the print duty value is equal to or less than the first threshold, and discriminates that the transport surface state is the second transport surface state when the print duty value is greater than the first threshold. When it is discriminated that the transport surface state is the first transport surface state, the print control section 114 causes belt cleaning to be performed under the first belt cleaning condition, and when it is discriminated that the transport surface state is the second transport surface state, the print control section 114 causes belt cleaning to be performed under the second belt cleaning condition, whereby the print control section 114 makes the belt cleaning different.

The printer 1 can change the belt cleaning condition of when belt cleaning is performed according to the transport surface state. The printer 1 can perform the belt cleaning according to the state of the transport surface 51*a*.

The first belt cleaning condition and the second belt cleaning condition include the belt cleaning time of the belt cleaning.

The printer 1 can adjust the belt cleaning condition by changing the belt cleaning time.

The belt cleaning time included in the first belt cleaning condition is the first belt cleaning time, and the belt cleaning time included in the second belt cleaning condition is the second belt cleaning time, which is longer than the first belt cleaning time.

The printer 1 lengthens the belt cleaning time when contamination on the transport surface 51*a* increases. The printer 1 can reliably remove contamination from the transport surface 51*a*.

Second Embodiment

In a second embodiment, the data process section 116 determines the belt cleaning condition including the belt drive speed using the print duty value. The storage unit 112 stores the control table 112*a* shown in FIG. 11. The data process section 116 determines the belt cleaning condition using the control table 112*a* shown in FIG. 11. The print control section 114 causes the belt cleaning mechanism 90 to execute belt cleaning under the determined belt cleaning condition.

FIG. 11 shows an example of the control table 112*a*. FIG. 11 associates the print duty range, the belt drive speed, and the belt cleaning time. The print duty range included in the control table 112*a* corresponds to the print duty value calculated by the data process section 116. The belt drive speed and the belt cleaning time are included in the belt cleaning condition. The belt drive speed corresponds to an example of a movement speed.

In the second embodiment, the control unit 110 determines the belt cleaning condition in accordance with the flowcharts shown in FIGS. 9 and 10, as in the first embodiment. The belt cleaning condition to be determined includes the belt drive speed and the belt cleaning time. When performing belt cleaning, the print control section 114 rotates the transport belt 51 at a predetermined belt drive speed.

The print duty range included in the control table 112*a* is divided into four by thresholds. The print duty range is divided into ranges of 20% or less, 21% to 40%, 41% to 60%, and 61% or more. The print duty range values 20%, 40%, and 60% are thresholds. The values 20%, 40% and 60% of the print duty range are a first threshold, a second threshold, and a third threshold, respectively. The values 21%, 41% and 61% in the print duty range shown in FIG. 11 indicate values larger than the first threshold, the second threshold, and the third threshold, respectively. The four sections each corresponds to a transport surface state of the transport belt 51. The data process section 116 can discriminate the transport surface state by comparing the print duty value calculated based on the print data with the threshold and the print duty range in the control table 112*a*.

The plurality of belt drive speeds included in the control table 112*a* correspond to the four divided print duty ranges. The belt drive speeds 500 mm/s, 375 mm/s, 250 mm/s, and 125 mm/s are the first belt drive speed, the second belt drive speed, the third belt drive speed, and the fourth belt drive speed, respectively. The data process section 116 generates the belt cleaning condition including the belt drive speed corresponding to the print duty value calculated based on the print data. The first belt drive speed corresponds to an example of a first movement speed. The second belt drive speed corresponds to an example of a second movement speed.

In the control table 112*a* shown in FIG. 11, as the value of the print duty range increases, the belt drive speed decreases. When the calculated print duty value is equal to or less than the first threshold, the belt drive speed included in the belt cleaning condition is 500 mm/s, which is the first belt drive speed. When the calculated print duty value is larger than the first threshold, the belt drive speed included in the belt cleaning condition is 375 mm/s, which is the second belt drive speed. The first belt drive speed corresponds to an example of a first speed. The second belt drive speed corresponds to an example of a second speed.

The plurality of belt cleaning times included in the control table 112*a* correspond to four divided print duty ranges. The belt cleaning times of 5 seconds, 10 seconds, 23 seconds, and seconds are the first belt cleaning time, the second belt cleaning time, the third belt cleaning time, and the fourth belt cleaning time, respectively. The data process section 116 determines belt cleaning condition including the belt cleaning time corresponding to the print duty value calculated based on the print data.

It will be assumed that the print duty values calculated based on the print data are, for example, 15% and 35%. When the calculated print duty value is 15%, the data process section 116 discriminates that the print duty value is within the print duty range of 0 to 20%. The data process section 116 discriminates that the transport surface 51*a* is in a first transport surface state. When the calculated print duty value is 35%, the data process section 116 discriminates that the print duty value is within the print duty range of 21 to 40%. The data process section 116 discriminates that the transport surface 51*a* is in a second transport surface state. When the calculated print duty value is 15%, the belt drive time and the belt cleaning time included in the first belt cleaning condition are 500 mm/s and 5 seconds. When the calculated print duty value is 35%, the belt drive time and the belt cleaning time included in the second belt cleaning condition are 375 mm/s and 10 seconds.

The transport surface 51*a* in the first transport surface state is less contaminated by ink or the like than the transport surface 51*a* in the second transport surface state. The belt drive speed when the belt cleaning is performed on the transport surface 51*a* in the first transport surface state will be faster than the belt drive speed when the belt cleaning is performed on the transport surface 51*a* in the second transport surface state. The belt cleaning time when the belt cleaning is performed on the transport surface 51*a* in the first transport surface state will be shorter than the belt cleaning time when the belt cleaning is performed on the transport surface 51*a* in the second transport surface state. When the amount of contamination on the transport surface 51*a* is small, the print control section 114 increases the belt drive speed and shortens the belt cleaning time compared to when the amount of contamination on the transport surface 51*a* is large. By increasing the belt drive speed, the print control section 114 can shorten the time for which the transport belt 51 is circulated a required number of times. The print control section 114 can perform the belt cleaning on the transport belt 51 that circulates a desired number of times in a minimum belt cleaning time.

The print control section 114 rotates the transport belt 51 when the belt cleaning mechanism 90 performs belt cleaning. The first belt cleaning condition and the second belt cleaning condition include a belt drive speed of the transport belt 51.

The printer 1 can change the belt cleaning condition according to the transport surface state by changing the belt drive speed.

The belt drive speed included in the first belt cleaning condition is the first belt drive speed, and the belt drive speed included in the second belt cleaning condition is a second belt drive speed, which is slower than the first belt drive speed.

The printer 1 can execute the belt cleaning in a short time when there is little contamination on the transport surface 51*a* of the transport belt 51.

Third Embodiment

In a third embodiment, the data process section 116 uses the print duty value to determine the belt cleaning condition, including the cleaning cloth transport amount. The storage unit 112 stores the control table 112*a* shown in FIG. 12. The data process section 116 determines the belt cleaning condition using the control table 112*a* shown in FIG. 12. The print control section 114 causes the belt cleaning mechanism 90 to execute belt cleaning under the determined belt cleaning condition. The belt cleaning mechanism 90 transports the cleaning cloth C at a predetermined transport speed when belt cleaning is performed on the transport belt 51.

FIG. 12 shows an example of the control table 112*a*. FIG. 12 associates the print duty range, the belt cleaning time, and the cleaning cloth transport amount. The print duty range included in the control table 112*a* corresponds to the print duty value calculated by the data process section 116. The belt cleaning time and the cleaning cloth transport amount are included in the belt cleaning condition. The cleaning cloth transport amount corresponds to an example of a transport amount.

In the third embodiment, the control unit 110 determines the belt cleaning condition as in the first embodiment, in accordance with the flowcharts shown in FIGS. 9 and 10. The belt cleaning condition to be determined includes the belt cleaning time and the cleaning cloth transport amount. When performing belt cleaning, the print control section 114 transports the cleaning cloth C at a predetermined transporting speed.

The print duty range included in the control table 112*a* is divided into four by thresholds. The print duty range is divided into 20% or less, 21% to 40%, 41% to 60%, and 61% or more. The print duty range values 20%, 40%, and 60% are thresholds. The values 20%, 40% and 60% of the print duty range are a first threshold, a second threshold, and a third threshold, respectively. The four sections each corresponds to a transport surface state of the transport belt 51.

The data process section 116 can discriminate the transport surface state by comparing the print duty value calculated based on the print data with the threshold in the control table 112*a*.

The plurality of belt cleaning times included in the control table 112*a* correspond to four divided print duty ranges. The belt cleaning times of 20 seconds, 30 seconds, 45 seconds, and 90 seconds are a first belt cleaning time, a second belt cleaning time, a third belt cleaning time, and a fourth belt cleaning time, respectively. The data process section 116 generates the belt cleaning condition including the belt cleaning time corresponding to the print duty value calculated based on the print data.

The cleaning cloth transport amounts included in the control table 112*a* correspond to the four divided print duty ranges. The cleaning cloth transport amounts 40 mm, 60 mm, 90 mm, and 180 mm are a first cleaning cloth transport amount, a second cleaning cloth transport amount, a third cleaning cloth transport amount, and a fourth cleaning cloth transport amount, respectively. The data process section 116 determines the belt cleaning condition including the cleaning cloth transport amount corresponding to the print duty value calculated based on the print data.

It will be assumed that the print duty values calculated based on the print data are, for example, 10% and 30%. When the print duty value is 10%, the data process section 116 discriminates that the print duty value is within the print duty range of 0 to 20%. The data process section 116 discriminates that the transport surface 51*a* is in a first transport surface state. When the print duty value is 30%, the data process section 116 discriminates that the print duty value is within the print duty range of 21 to 40%. The data process section 116 discriminates that the transport surface 51*a* is in the second transport surface state. When the calculated print duty value is 10%, the belt cleaning time and the cleaning cloth transport amount included in the first belt cleaning condition are 20 seconds and 40 mm, respectively. When the calculated print duty value is 30%, the belt cleaning time and the cleaning cloth transport amount included in the second belt cleaning condition are 30 seconds and 60 mm, respectively.

The data process section 116 acquires the cleaning cloth transport amount included in the belt cleaning condition from the cleaning cloth transport amount included in the control table 112*a*, but the present disclosure is not limited thereto. The data process section 116 may calculate the cleaning cloth transport amount from the transport speed of the cleaning cloth C and the belt cleaning time.

The belt cleaning mechanism 90 includes the cleaning cloth C that contacts the transport belt 51, and can transport the cleaning cloth C.

The first belt cleaning condition and the second belt cleaning condition include the cleaning cloth transport amount of the cleaning cloth C.

The printer 1 can adjust the cleaning intensity when the belt cleaning is performed by the cleaning cloth transport amount.

Fourth Embodiment

In a fourth embodiment, the data process section 116 determines the belt cleaning condition using the charging current. The storage unit 112 stores the control table 112*a* shown in FIG. 13. The data process section 116 determines the belt cleaning condition using the control table 112*a* shown in FIG. 13. The print control section 114 causes the belt cleaning mechanism 90 to execute belt cleaning under the determined belt cleaning condition.

FIG. 13 shows an example of the control table 112*a*. FIG. 13 associates a charging current range and the belt cleaning time. The charging current range included in the control table 112*a* corresponds to the charging current detected by the current detection section 87. The belt cleaning time is included in the belt cleaning condition.

The charging current range included in the control table 112*a* is divided into four by thresholds. The charging current range is divided into 0.70 mA or less, 0.71 mA to 0.80 mA, 0.81 mA to 0.90 mA, and 0.91 mA or more. The charging current range values 0.70 mA, 0.80 mA, and 0.90 mA are thresholds. The charging current range values 0.70 mA, 0.80 mA, and 0.90 mA are a first threshold, a second threshold, and a third threshold, respectively. The four sections each corresponds to a transport surface state of the transport belt 51. The data process section 116 can discriminate the transport surface state by comparing the print duty value calculated based on the print data with the threshold in the control table 112*a*.

The plurality of belt cleaning times included in the control table 112*a* correspond to four divided charging current ranges. The belt cleaning times of 0 seconds, 20 seconds, 35 seconds, and 90 seconds are the first belt cleaning time, the second belt cleaning time, the third belt cleaning time, and the fourth belt cleaning time, respectively. Belt cleaning for 0 seconds indicates that belt cleaning is not performed. The data process section 116 determines belt cleaning condition including the belt cleaning time corresponding to the charging current detected by the current detection section 87.

Figure 14:
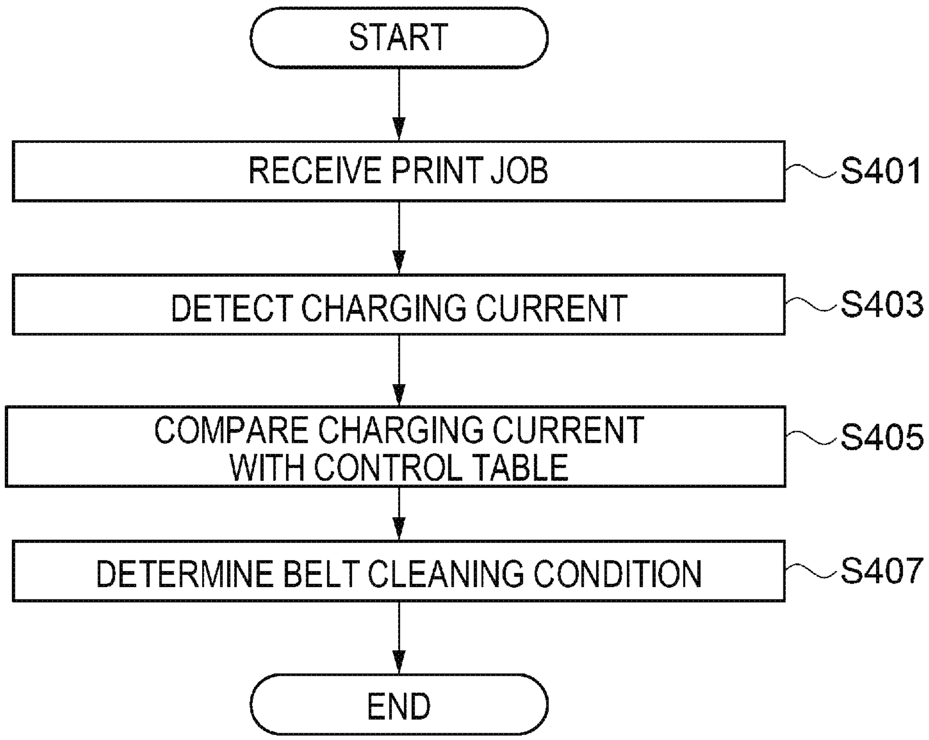
FIG. 14 is a diagram showing a flowchart of determining the belt cleaning condition.

In the fourth embodiment, the control unit 110 determines the belt cleaning condition in accordance with the flowchart shown in FIG. 14. FIG. 14 shows a flowchart for determining belt cleaning condition. FIG. 14 shows a flow of determining belt cleaning condition by using the control table 112*a* shown in FIG. 13. The determined belt cleaning condition includes the belt cleaning time.

The control unit 110 receives the print job in step S401. The print job includes the print request, the print data, and the printing condition. The print control section 114 receives the print job from the print control device 150 or the like. The print control section 114 uses the belt unit movement mechanism 60 to move the transport belt unit 50 to the recording position KP.

When the control unit 110 receives the print job, it detects the charging current in step S403. The print control section 114 rotates the transport belt 51. The print control section 114 uses the charging roller 81 to charge the rotating transport belt 51. The current detection section 87 detects the charging current when the charging roller 81 charges the transport belt 51. While the current detection section 87 detects the charging current, the print control section 114 does not cause the transport mechanism 15 to transport the print medium M. The current detection section 87 detects the charging current while the transport belt 51, without print medium M supported thereon, is charged. The data process section 116 receives the charging current detected by the current detection section 87. The data process section 116 acquires the control table 112*a* stored in the storage unit 112.

After detecting the charging current, then in step S405 the control unit 110 compares the detected charging current with the control table 112*a* shown in FIG. 13. The data process section 116 compares the detected charging current with the charging current range included in the control table 112*a*. The data process section 116 discriminates the transport surface state by comparing the detected charging current with the charging current range included in the control table 112*a*.

In step S407, the control unit 110 determines a belt cleaning condition. The data process section 116 compares the detected charging current with the control table 112*a* to determine the belt cleaning time. The belt cleaning time is included in the belt cleaning condition. The data process section 116 transmits the belt cleaning condition including the belt cleaning time to the print control section 114. The print control section 114 causes the belt cleaning mechanism 90 to execute the belt cleaning of the received belt cleaning condition. After causing the belt cleaning mechanism 90 to perform belt cleaning, the print control section 114 causes the transport mechanism 15 and the printing unit 18 to perform printing based on the print data included in the print job.

The control unit 110 causes the belt cleaning mechanism 90 to perform the belt cleaning when the control unit 110 receives the print job, but the present disclosure is not limited thereto. When the control unit 110 receives the print job, the control unit 110 causes the transport mechanism 15 and the printing unit 18 to execute printing. After executing printing, the control unit 110 determines the belt cleaning condition. The control unit 110 may execute the belt cleaning under the determined belt cleaning condition.

The printer 1 includes the charging roller 81 that charges the transport belt 51, and the current detection section 87 that detects a charging current when the transport belt 51 is charged by the charging roller 81. The data process section 116 discriminates the transport surface state based on the charging current detected by the current detection section 87.

The printer 1 can accurately discriminate the transport surface 51*a* of the transport belt 51.

The print control section 114 changes the belt cleaning by adjusting the belt cleaning time of the belt cleaning.

By using different belt cleaning times, the printer 1 can execute belt cleaning according to the transport surface state.

What is claimed is:

1. A recording device configured to perform recording on a recording medium, comprising:

a recording unit configured to perform the recording by ejecting ink onto the recording medium;

a medium transport belt configured to transport the recording medium on which the recording is to be performed by the recording unit;

a charging unit configured to charge the medium transport belt;

a detection section configured to:

detect a charging condition of the charge of the medium transport belt; and acquire, as the charging condition, one of a maximum charging current or an average charging current based on a rotation of the medium transport belt a specific number of times;

a cleaning unit configured to move to a contact position at which the cleaning unit is in contact with the medium transport belt or a non-contact position at which the cleaning unit is not in contact with the medium transport belt, and to perform a cleaning operation on the medium transport belt when the cleaning unit is positioned at the contact position;

a discrimination section configured to discriminate a surface state of the medium transport belt based on the acquired charging condition by the detection section; and a control section configured to cause the cleaning unit to execute the cleaning operation according to the surface state of the medium transport belt discriminated by the discrimination section.

2. The recording device according to claim 1, wherein the control section is configured to change the cleaning operation by adjusting an execution time of the cleaning operation.

3. A recording device configured to perform recording on a recording medium, comprising:

a recording unit configured to perform the recording by ejecting ink onto the recording medium;

a medium transport belt configured to transport the recording medium on which the recording is to be performed by the recording unit;

a cleaning unit configured to move to a contact position at which the cleaning unit is in contact with the medium transport belt or a non-contact position at which the cleaning unit is not in contact with the medium transport belt, and to perform a cleaning operation on the medium transport belt when the cleaning unit is positioned at the contact position;

a discrimination section configured to:

receive a print job including print data and printing conditions, wherein the print data is data corresponding to one sheet of the recording medium, and the printing conditions include at least one of a size of the recoming medium, a single-sided/double-sided print, or a type of the ink to be ejected; and discriminate a surface state of the medium transport belt based on the print job; and a control section configured to cause the cleaning unit to execute the cleaning operation according to the surface state of the medium transport belt discriminated by the discrimination section.

4. The recording device according to claim 3, wherein the control section moves the medium transport belt when the cleaning unit executes the cleaning operation, and a first condition and a second condition include a movement speed of the medium transport belt.

5. The recording device according to claim 4, wherein the movement speed included in the first condition is a first speed, and the movement speed included in the second condition is a second speed slower than the first speed.

6. The recording device according to claim 3, wherein the cleaning unit includes a cleaning material in contact with the medium transport belt, and is configured to transport the cleaning material by using a cleaning material transport mechanism, and a first condition and a second condition include a transport amount of the cleaning material.

* * * * *